(12) United States Patent
Ohtani et al.

(10) Patent No.: US 9,291,175 B2
(45) Date of Patent: Mar. 22, 2016

(54) ELECTRICALLY ACTUATED BOOSTER

(71) Applicant: Hitachi, Ltd., Tokyo (JP)

(72) Inventors: Yukio Ohtani, Kawasaki (JP); Junichi Ikeda, Kawasaki (JP); Kazuhiro Nagai, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 155 days.

(21) Appl. No.: 13/930,371

(22) Filed: Jun. 28, 2013

(65) Prior Publication Data

US 2013/0291534 A1    Nov. 7, 2013

Related U.S. Application Data

(62) Division of application No. 11/991,733, filed as application No. PCT/JP2006/319037 on Sep. 26, 2006, now Pat. No. 8,500,213.

(30) Foreign Application Priority Data

Sep. 26, 2005    (JP) ................................. 2005-278220

(51) Int. Cl.
*B60T 13/74*    (2006.01)
*F15B 15/20*    (2006.01)
(Continued)

(52) U.S. Cl.
CPC ................. *F15B 15/20* (2013.01); *B60T 7/042* (2013.01); *B60T 8/3275* (2013.01); *B60T 13/02* (2013.01); *B60T 13/745* (2013.01); *B60T 2220/04* (2013.01); *B60T 2270/604* (2013.01)

(58) Field of Classification Search
CPC ....... B60T 7/042; B60T 8/3275; B60T 13/02; B60T 13/745; B60T 2220/04; B60T 2270/604; F16B 15/20

USPC ........ 303/3, 15, 20, 113.3, 113.4, 114.1, 162; 60/545

See application file for complete search history.

(56) References Cited

U.S. PATENT DOCUMENTS

| | | | |
|---|---|---|---|
| 4,395,883 A | 8/1983 | Meliant | |
| 4,667,476 A * | 5/1987 | Takata et al. | 60/545 |

(Continued)

FOREIGN PATENT DOCUMENTS

| | | |
|---|---|---|
| JP | 60-92151 | 5/1985 |
| JP | 6-191385 | 7/1994 |

(Continued)

OTHER PUBLICATIONS

International Search Report issued Jan. 9, 2007 in International (PCT) Application of which the present application is the U.S. National Stage.

*Primary Examiner* — Thomas J Williams
*Assistant Examiner* — Mariano Sy
(74) *Attorney, Agent, or Firm* — Wenderoth, Lind & Ponack, L.L.P.

(57) ABSTRACT

An electrically actuated booster performs displacement control such that the relative displacement relationship between an input member and an assist member is variable according to the absolute displacement of the input member. A target displacement that makes variable the relative displacement relationship between an input piston and a booster piston is set according to a detection signal from a potentiometer (86), and displacement control is performed so that the relative displacement between the two pistons becomes equal to the target displacement on the basis of a signal from a relative displacement sensor (100) that detects the relative displacement between the two pistons.

16 Claims, 26 Drawing Sheets

(51) Int. Cl.
*B60T 7/04* (2006.01)
*B60T 8/32* (2006.01)
*B60T 13/02* (2006.01)

(56) References Cited

U.S. PATENT DOCUMENTS

| | | | |
|---|---|---|---|
| 4,678,243 A * | 7/1987 | Leiber | 303/113.4 |
| 4,918,921 A | 4/1990 | Leigh-Monstevens et al. | |
| 5,609,399 A * | 3/1997 | Feigel et al. | 303/113.4 |
| 6,213,568 B1 * | 4/2001 | Feigel | 303/114.1 |
| 6,574,959 B2 | 6/2003 | Fulks et al. | |
| 6,634,724 B2 * | 10/2003 | Kobayashi et al. | 303/155 |
| 6,758,041 B2 | 7/2004 | Bishop et al. | |
| 7,367,187 B2 | 5/2008 | Ikeda et al. | |
| 7,823,384 B2 | 11/2010 | Ikeda et al. | |
| 7,861,522 B2 * | 1/2011 | Obata et al. | 60/545 |
| 8,096,122 B2 * | 1/2012 | Ikeda et al. | 60/545 |
| 8,500,213 B2 * | 8/2013 | Ohtani et al. | 303/3 |
| 2002/0158510 A1 | 10/2002 | Kobayashi et al. | |
| 2007/0199436 A1 * | 8/2007 | Ikeda et al. | 91/376 R |
| 2008/0231109 A1 | 9/2008 | Yamada et al. | |
| 2008/0302100 A1 * | 12/2008 | Ohtani et al. | 60/545 |
| 2009/0178404 A1 | 7/2009 | Ikeda et al. | |
| 2009/0217659 A1 | 9/2009 | Ohno et al. | |

FOREIGN PATENT DOCUMENTS

| | | |
|---|---|---|
| JP | 10-53122 | 2/1998 |
| JP | 10-138909 | 5/1998 |
| JP | 2000-233733 | 8/2000 |
| JP | 2002-321611 | 11/2002 |
| JP | 2003-252189 | 9/2003 |

* cited by examiner

ELECTRICALLY ACTUATED BOOSTER

This application is divisional of application Ser. No. 11/991,733, now U.S. Pat. No. 8,500,213, which is the National Stage of International Application No. PCT/JP2006/319037, filed Sep. 26, 2006.

BACKGROUND OF THE INVENTION

1. Technical Field

The present invention relates to an electrically actuated booster for use in an automotive brake mechanism or the like.

2. Description of the Related Art

There have heretofore been electrically actuated boosters that boost a pedal input with a electrically-operated actuator and output the boosted pedal input to a master cylinder. Among such electrically actuated boosters are those disclosed in the following patent documents.

Japanese Patent Application Publication No. Sho 60-92151 discloses an electrically actuated booster having an assist member (electromagnetic device) provided to assist the transmission of force from an input rod to a master cylinder. The electrically actuated booster further has a relative displacement sensor that detects a relative displacement between the input rod and the assist member. In the electrically actuated booster, the displacement of the assist member is controlled so that the input rod and the assist member are displaced together as one unit, i.e. the relative displacement detected by the relative displacement sensor is kept zero.

Japanese Patent Application Publication No. Hei 10-53122 discloses an electrically actuated booster in which an input rod that receives a pedal input and an assist member (piston shaft) are connected so that when the input rod is pressed, a controller applies force generated by an electric motor to the assist member, thereby displacing the assist member together with the input rod as one unit, and thus boosting the pedal input and outputting the boosted pedal input to a master cylinder.

Japanese Patent Application Publication No. Hei 10-138909 discloses an electrically actuated booster having an input rod that receives a pedal input and an assist member (main piston) operating in association with the input rod. One end of the assist member faces a pressure chamber of a master cylinder. When the input rod is pressed, a controller applies force generated by an electric motor to the assist member, thereby displacing the assist member, and thus boosting the pedal input and outputting the boosted pedal input to the master cylinder.

SUMMARY OF THE INVENTION

1. Problem to be Solved by the Invention

In the electrically actuated boosters disclosed in the above-described patent documents, however, the assist member is controlled so that the relative displacement between the input member and the assist member is kept constant at all times. The boosters cannot control the displacement of the assist member in such a manner as to change the relative displacement relationship between the input member and the assist member. In addition, the boosters are not arranged to detect an absolute displacement of the input member and to perform displacement control such that the relative displacement relationship between the input member and the assist member is freely changed according to the absolute displacement of the input member.

More specifically, in the booster disclosed in JP 60-92151, the displacement is controlled so that the relative displacement between the input member and the assist member is kept zero at all times, and the relative displacement relationship between the input member and the assist member cannot be variably controlled. Further, the booster disclosed in JP 60-92151 does not detect the absolute displacement of the input member and does not include a technique to perform displacement control such that the relative displacement relationship between the input member and the assist member is freely changed according to the absolute displacement of the input member.

In the booster disclosed in JP 10-53122, the input member and the assist member are arranged to move together as one unit. Therefore, the relative displacement relationship between the input member and the assist member cannot be varied, as a matter of course. Further, the booster disclosed in JP 10-53122 does not detect the absolute displacement of the input member and does not include a technique to perform displacement control such that the relative displacement relationship between the input member and the assist member is freely changed according to the absolute displacement of the input member.

In the booster disclosed in JP 10-138909, the input member and the assist member are displaceable relative to each other. However, detection of the relative displacement between the two members is not taken into consideration at all. Accordingly, the relative displacement relationship between the input member and the assist member cannot be variably controlled. Further, the booster disclosed in JP 10-138909 does not detect the absolute displacement of the input member and does not include a technique to perform displacement control such that the relative displacement relationship between the input member and the assist member is freely changed according to the absolute displacement of the input member.

The present invention has been made in view of the above-described circumstances. Accordingly, an object of the present invention is to provide an electrically actuated booster capable of obtaining various desired brake characteristics and improving brake feeling by performing displacement control such that the relative displacement relationship between the input member and the assist member is variable according to the absolute displacement (including estimated absolute displacement) of the input member.

2. Means for Solving the Problem

The invention is an electrically actuated booster having an input member that moves forward and backward in response to an operation of a brake pedal, an assist member arranged to be movable relative to the input member, and a electrically-operated actuator that causes the assist member to move forward and backward, wherein a boosted brake fluid pressure is generated in a master cylinder by an assist thrust applied to the assist member according to movement of the input member caused by the brake pedal. The electrically actuated booster is characterized by including input absolute displacement detecting means that detects an absolute displacement of the input member, and either one of relative displacement detecting means that detects a relative displacement between the input member and the assist member and assist absolute displacement detecting means that detects an absolute displacement of the assist member. Further, the electrically actuated booster is provided with control means that sets a target displacement that makes variable the relative displacement relationship between the input member and the assist member according to a detection signal from the input absolute displacement detecting means and that controls the electrically-operated actuator so that the relative displacement relationship between the input member and the assist member becomes equal to the target displacement on the basis of a signal from the relative displacement detecting means or the assist absolute displacement detecting means.

The electrically actuated booster is characterized in that a brake fluid pressure is generated in the master cylinder by an input thrust applied to the input member from the brake pedal and an assist thrust applied to the assist member from the electrically-operated actuator, and even when the input member and the assist member are displaced relative to each other, a part of a reaction caused by the brake fluid pressure is transmitted to the input member, and another part of the reaction is transmitted to the assist member.

Further, an urging means is provided between the input member and the assist member to urge the input member relative to the assist member toward a neutral position of relative displacement therebetween.

The control means controls the electrically-operated actuator so that, as the input member moves in a direction for increasing the brake fluid pressure, the absolute displacement of the assist member becomes larger or smaller than the absolute displacement of the input member.

Further, the control means controls the electrically-operated actuator on the basis of the signal from the input absolute displacement detecting means such that when the absolute displacement of the input member is detected to have moved from an initial position by a predetermined amount, the assist member is started to be displaced so that the absolute displacement of the assist member becomes equal to or larger than the absolute displacement of the input member.

When the absolute displacement of the input member detected by the input absolute displacement detecting means has become a predetermined amount, the control means controls the electrically-operated actuator so that the absolute displacement of the assist member becomes larger than the absolute displacement of the input member.

Another aspect of the invention is that, when the control means judges from the absolute displacement of the input member detected by the input absolute displacement detecting means that the speed of movement of the input member has reached a predetermined speed, the control means controls the electrically-operated actuator so that the absolute displacement of the assist member becomes larger than the absolute displacement of the input member.

Another aspect of the invention is that, when the control means judges from the absolute displacement of the input member detected by the input absolute displacement detecting means that movement of the input member in a direction for increasing the brake fluid pressure has stopped, the control means sets a target displacement so that the assist member is displaced relative to the input member by a predetermined amount in the direction for increasing the brake fluid pressure, and controls the electrically-operated actuator on the basis of the target displacement.

Further, the control means is connected to an acceleration sensor that detects an operation of an accelerator pedal or connected to a throttle sensor that detects opening and closing of an engine throttle, and when the acceleration sensor detects cancellation of the operation of the accelerator pedal or when the throttle sensor detects that the engine throttle has been closed, the control means controls the electrically-operated actuator so that the assist member is displaced relative to the input member in a direction for increasing the brake fluid pressure to reduce an ineffective stroke of the master cylinder.

Another aspect of the invention is that, when a braking operation by a regenerative braking system is performed, the control means controls the electrically-operated actuator so that the assist member is displaced relative to the input member in a direction for reducing the brake fluid pressure.

The input absolute displacement detecting means is a displacement sensor that detects an absolute displacement of the input member relative to a fixed part.

Also, the input absolute displacement detecting means detects an absolute displacement of the input member by computing a detection signal from any one of a brake pedal depressing force sensor that detects a depressing force applied to the brake pedal, an electric current sensor that detects an amount of electric current supplied to an electric motor constituting the electrically-operated actuator, and a fluid pressure sensor that detects a fluid pressure generated by a piston in the master cylinder.

3. Advantageous Effects of the Invention

According to the inventions set forth in appended claims, it is possible to obtain various brake characteristics, for example, brake assist control characteristics, by performing displacement control such that the relative displacement relationship between the input member and the assist member is variable according to a detection signal from the input absolute displacement detecting means. In view of the fact that the change in fluid pressure with the stroke is, in general, smaller in a low fluid pressure region than in a high fluid pressure region, the displacement control in which the stroke is controlled has the advantage that braking in the low fluid pressure region, which is frequently used for brakes, can be performed with high accuracy.

According to the invention, the input member is adapted to receive a part of the reaction caused by the brake fluid pressure. Therefore, the fluid pressure generated according to the stroke of the input member can be increased or reduced by changing the relative displacement relationship between the input member and the assist member, and the brake pedal depressing force relative to the stroke of the input member can be changed according to the increase or reduction in the fluid pressure. Thus, the relationship between the stroke of the input member on the one hand and on the other the brake fluid pressure and the brake pedal depressing force can be adjusted as desired.

Further, urging means is provided to urge the input member relative to the assist member toward the neutral position of the relative displacement therebetween. Therefore, the boost ratio can be varied by changing the relative displacement relationship between the input member and the assist member.

Figure 1:
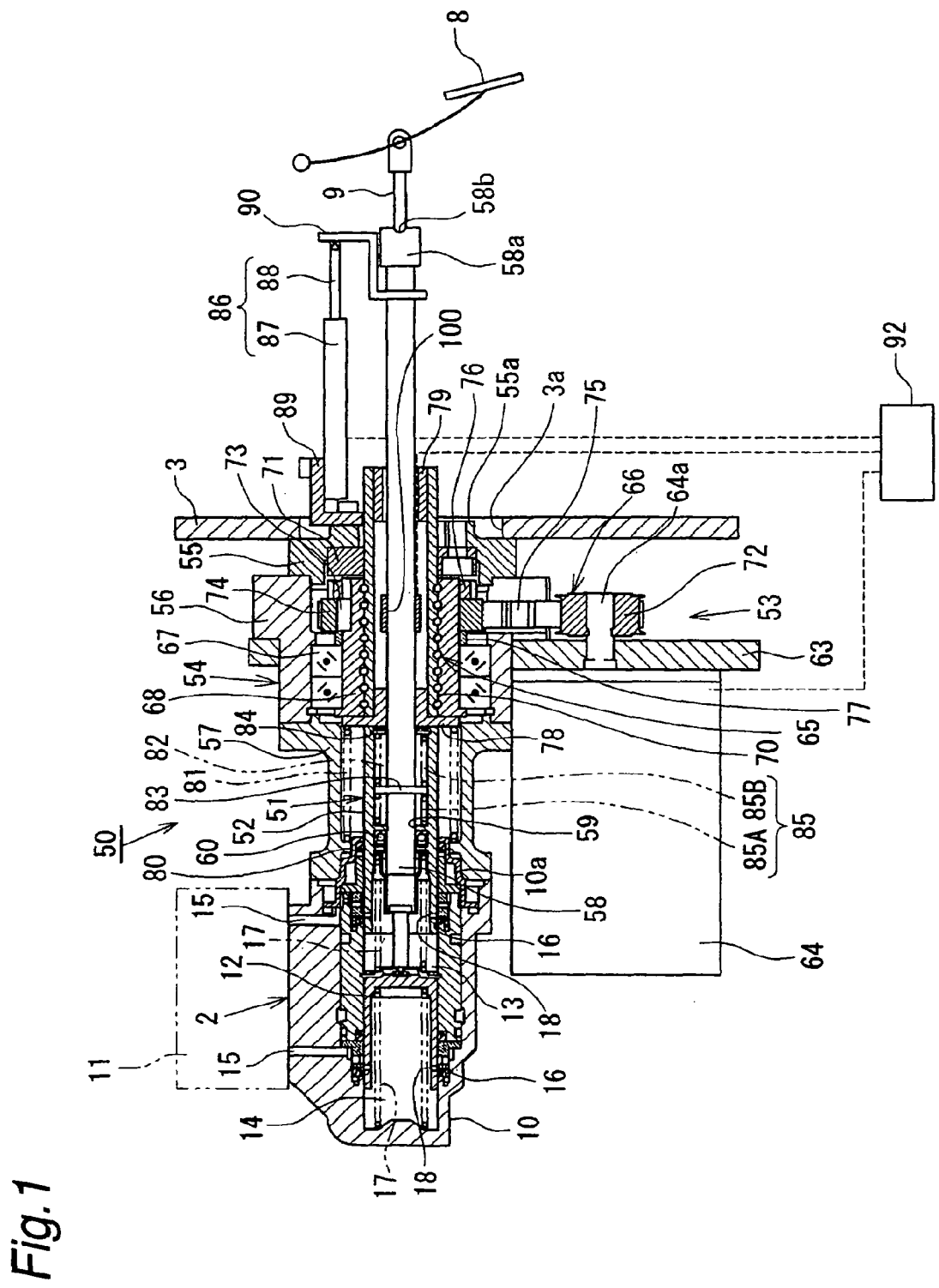
FIG. 1 is a sectional view showing an electrically actuated booster according to a first embodiment of the present invention.

EXPLANATION OF REFERENCE NUMERALS 50, 50A, 50B, 50C . . . electrically actuated booster, 52 . . . booster piston (assist member), 58 . . . input piston (input member), 85 (85A, 85B) . . . spring (urging means), 86 . . . potentiometer (input absolute displacement detecting means), 91 . . . resolver (assist absolute displacement detecting means), 92, 92A, 92C . . . controller (control means), 100 . . . relative displacement sensor (relative displacement detecting means).

DETAILED DESCRIPTION OF THE INVENTION

An electrically actuated booster according to a first embodiment of the present invention will be explained below with reference to FIGS. 1 to 17.

In FIG. 1, an electrically actuated booster 50 has a piston assembly 51 including a booster piston (assist member) 52 and also serving as a primary piston of a tandem master cylinder 2. The electrically actuated booster 50 further has a electrically-operated actuator 53 that applies a thrust (booster thrust) to the booster piston 52 constituting the piston assembly 51. The piston assembly 51 is provided in a housing 54 secured to a compartment wall 3. The electrically-operated actuator 53 is provided outside the housing 54.

The housing 54 comprises a first tubular member 56 secured to the front surface of the compartment wall 3 through a ring-shaped mounting member 55, and a second tubular member 57 coaxially connected to the first tubular member 56. The tandem master cylinder 2 is connected to the forward end of the second tubular member 57. A support plate 63 is mounted on the first tubular member 56. An electric motor 64 constituting the electrically-operated actuator 53 is secured to the support plate 63. It should be noted that the mounting member 55 has an inner peripheral boss portion 55a secured to the compartment wall 3 so as to be positioned in an opening 3a of the compartment wall 3. In this embodiment, the electric motor 64 is a DC brushless motor.

The tandem master cylinder 2 has a cylinder body 10, one end of which is closed, and a reservoir 11. A secondary piston 12 is slidably provided in the inner part of the cylinder body 10. The secondary piston 12 makes a pair with the piston assembly 51 serving as the primary piston. The interior of the cylinder body 10 is divided by the piston assembly 51 and the secondary piston 12 to define two pressure chambers 13 and 14. In response to the forward movement of the two pistons (i.e. the piston assembly 51 and the secondary piston 12), brake fluid sealed in the pressure chambers 13 and 14 is supplied under pressure to the wheel cylinders of the associated systems.

The wall of the cylinder body 10 is provided with relief ports 15 respectively communicating the pressure chambers 13 and 14 with the reservoir 11. In addition, seal members 16 are provided on the inner surface of the cylinder body 10 forward of the relief ports 15, respectively. In response to the forward movement of the two pistons (i.e. the piston assembly 51 and the secondary piston 12), the pair of seal members 16 come in sliding contact with the respective outer peripheral surfaces (rearward of later-described through-holes 18) of the booster piston 52 of the piston assembly 51 and the secondary piston 12 associated with the seal members 16, thereby closing the pressure chambers 13 and 14 to the associated relief ports 15. It should be noted that the pressure chambers 13 and 14 are provided therein with return springs 17 that respectively urge rearward the booster piston 52 of the piston assembly 51 and the secondary piston 12. The respective forward ends of the booster piston 52 and the secondary piston 12 are provided with through-holes 18 that are communicable with the relief ports 15 in the master cylinder 2 when the electrically actuated booster is in its initial position (shown in the figure) during non-braking operation.

The piston assembly 51 has an input piston (input member) 58 fitted in the booster piston 52 so as to be movable relative thereto. The input piston 58 has a large-diameter portion 58*a* at the rear end thereof. A pedal-side shaft 9 extending from a brake pedal 8 is connected to the large-diameter portion 58*a*. Thus, the input piston 58 moves forward and backward in response to the operation of the brake pedal 8 (i.e. pedal operation). In this case, the pedal-side shaft 9 is connected to the large-diameter portion 58*a* in such a way that the distal end of the pedal-side shaft 9 is fitted in a spherical recess 58*b* provided on the large-diameter portion 58*a*, thereby allowing pivoting of the pedal-side shaft 9.

The booster piston 52 constituting the piston assembly 51 has a partition 59 therein at a longitudinally intermediate position thereof. The input piston 58 extends through the partition 59. The booster piston 52 has its forward end inserted in the pressure chamber (primary chamber) 13 in the master cylinder 2. The forward end of the input piston 58 is positioned inside the booster piston 52 in the pressure chamber 13. The interface between the booster piston 52 and the input piston 58 is sealed by a seal member 60 disposed forward of the partition 59 of the booster piston 52, and the interface between the booster piston 52 and a guide 10*a* of the cylinder body 10 of the master cylinder 2 is sealed by the above-described seal member 16, thereby preventing the brake fluid in the pressure chamber 13 from leaking to the outside of the master cylinder 2. The respective forward ends of the booster piston 52 and the secondary piston 12 are provided with through-holes 18 that are communicable with the relief ports 15 in the master cylinder 2 when the electrically actuated booster is in its initial position (shown in the figure) during non-braking operation.

The electrically-operated actuator 53 substantially comprises an electric motor 64 secured to a support plate 63 integral with the first tubular member 56 of the housing 54, a ball screw mechanism (rotation-rectilinear motion conversion mechanism) 65 provided in the first tubular member 56 in such a manner as to surround the input piston 58, and a rotation transmission mechanism 66 that transmits the rotation of the electric motor 64 to the ball screw mechanism 65 after reducing the speed thereof.

The ball screw mechanism 65 comprises a nut member (rotating member) 68 rotatably supported by the first tubular member 56 through a bearing (angular contact bearing) 67, and a hollow screw shaft (rectilinear motion member) 70 engaged with the nut member 68 through balls (reference numeral omitted). The rear end portion of the screw shaft 70 is nonrotatably but slidably supported by a ring guide 71 secured to the mounting member 55 of the housing 54. Thus, the screw shaft 70 moves rectilinearly in response to the rotation of the nut member 68.

Meanwhile, the rotation transmission mechanism 66 comprises a first pulley 72 mounted on an output shaft 64*a* of the electric motor 64, a second pulley 74 nonrotatably fitted to the nut member 68 through a key 73, and a belt (timing belt) 75 passed over the two pulleys 72 and 74. The second pulley 74 is larger in diameter than the first pulley 72. Thus, the rotation of the electric motor 64 is transmitted to the nut member 68 of the ball screw mechanism 65 after the speed thereof has been reduced. The bearing 67 is pre-loaded by a nut 76 screwed onto the nut member 68 through the second pulley 74 and a collar 77. It should be noted that the rotation transmission mechanism 66 is not necessarily limited to the above-described mechanism comprising pulleys and a belt but may be a reduction gear mechanism or the like.

A flange member 78 is fitted and secured to the forward end of the hollow screw shaft 70 constituting the ball screw mechanism 65, and a tubular guide 79 is fitted and secured to the rear end of the screw shaft 70. The flange member 78 and the tubular guide 79 have their inner diameters set so that they function as guides that slidably guide the input piston 58. The flange member 78 is adapted to abut against the rear end of the booster piston 52 in response to the forward movement of the screw shaft 70 in the leftward direction as viewed in FIG. 1. Consequently, the booster piston 52 also moves forward. The second tubular member 57 constituting the housing 54 is provided therein with a return spring 81, one end of which is retained by an annular projection 80 formed on the inner surface of the second tubular member 57, and the other end of which abuts against the flange member 78. The screw shaft 70 is positioned in the initial position (shown in the figure) by the return spring 81 when the brake is in an inoperative state.

An annular space 82 is defined between the input piston 58 and the booster piston 52. A pair of springs (urging means) 85 (85A and 85B) are provided in the annular space 82. The pair of springs 85 (85A and 85B) are each retained at one end thereof by a flange portion 83 provided on the input piston 58. The other end of the spring 85A is retained by the partition 59 of the booster piston 52. The other end of the spring 85B is retained by a retaining ring 84 fitted to the rear end of the booster piston 52. The pair of springs 85 serve to urge the input piston 58 relative to the booster piston 52 toward a neutral position of relative displacement therebetween and to retain the input piston 58 and the booster piston 52 at the neutral position of the relative movement when the brake is in an inoperative state. When the input piston 58 and the booster piston 52 have been displaced relative to each other from the neutral position in either direction, the pair of springs 85 urge the input piston 58 to return to the neutral position relative to the booster piston 52.

In the first embodiment, a potentiometer 86 (displacement sensor) is provided in the compartment as an example of input absolute displacement detecting means that detects an absolute displacement of the input piston 58 with respect to the vehicle body (hereinafter occasionally referred to as "input absolute displacement detected value A"). The potentiometer 86 comprises a body part 87 incorporating a resistor, and a sensor rod 88 extending from the body part 87 toward the brake pedal 8 in parallel to the input piston 58. The potentiometer 86 is mounted on a bracket 89 secured to the boss portion 55*a* of the mounting member 55 of the housing 54 such that the potentiometer 86 extends parallel to the input piston 58. The sensor rod 88 is constantly urged in its extension direction by a spring incorporated in the body part 87. The sensor rod 88 has its distal end abutting against a bracket 90 secured to the rear end of the input piston 58.

Between the input piston 58 and the screw shaft 70 is interposed a relative displacement sensor 100 (relative displacement detecting means) that detects a relative displacement between the input piston 58 and the booster piston 52 (hereinafter occasionally referred to as "relative displacement detected value B"), thereby detecting a relative displacement between the input piston 58 and the screw shaft (and hence the booster piston 52). The relative displacement sensor 100 physically detects a relative displacement between the input piston 58 and the booster piston 52 and outputs the detected data to a controller 92.

The controller 92 (control means) is connected to the potentiometer 86, the relative displacement sensor 100 and a drive unit (not shown) of the electric motor 64.

The controller 92 is further connected with an acceleration sensor (not shown) that detects an operation of an accelerator pedal (not shown), or a throttle sensor (not shown) that detects opening and closing of an engine throttle (not shown). When the acceleration sensor detects cancellation of the operation of the accelerator pedal, or when the throttle sensor detects that the engine throttle has been closed, the controller 92 controls the electrically-operated actuator 53 so that the booster piston 52 is displaced relative to the input piston 58 in the direction for increasing the brake fluid pressure to reduce the ineffective stroke of the master cylinder 2 (ineffective stroke reducing control).

Figure 3:
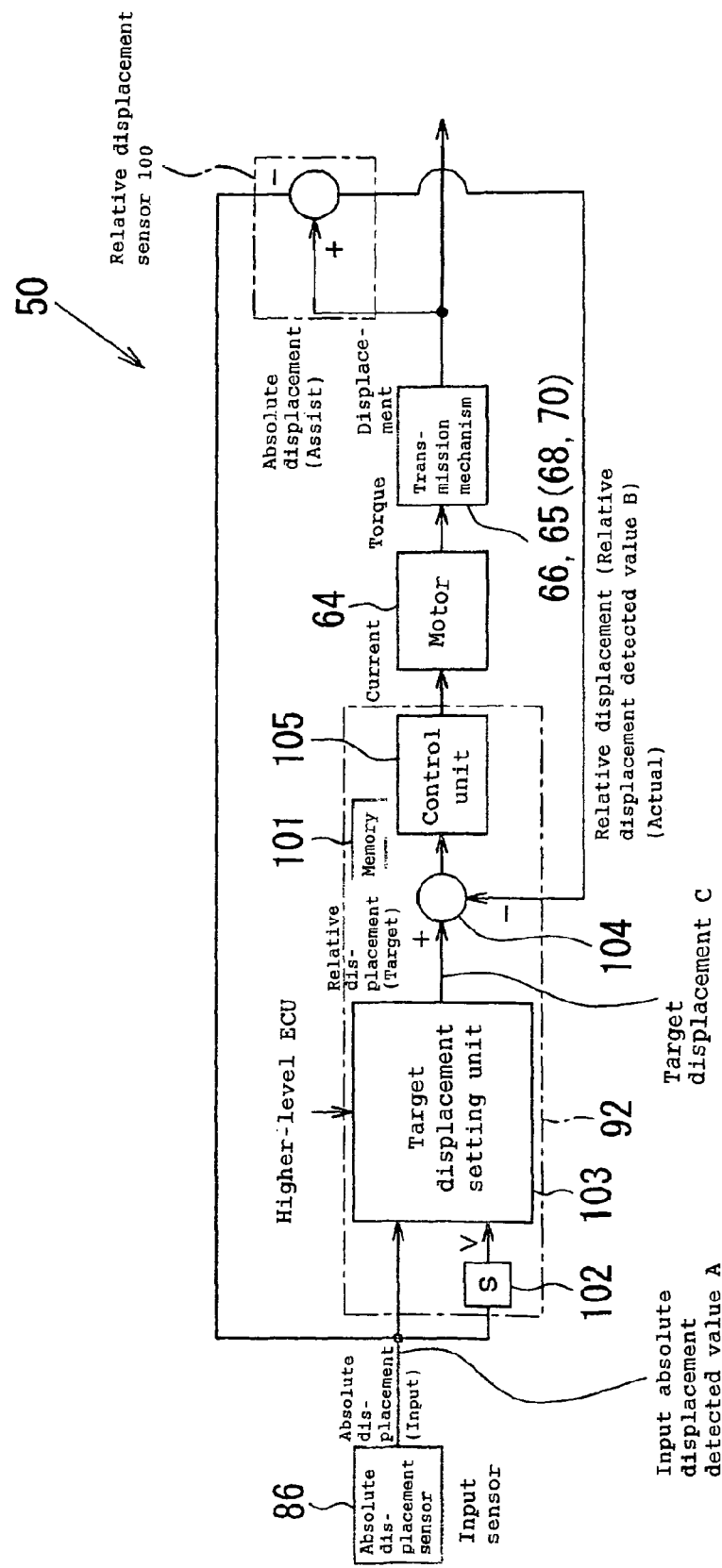
FIG. 3 is a block diagram showing a control system including a controller of the electrically actuated booster in FIG. 1.

The controller 92 has, as shown in FIG. 3, a memory 101 storing a program having the later-described computation and control contents (shown by the flowcharts of FIGS. 11 to 17), target displacement calculation characteristic data [shown in part (b) of FIGS. 4 to 10] represented by using an input stroke and a relative displacement corresponding thereto (described later), and input stroke-fluid pressure characteristic data shown in part (d) of FIG. 9.

As shown in FIG. 3, the controller 92 has, in addition to the memory 101, a differentiating circuit 102, a target displacement setting unit 103, a subtracting circuit 104, and a control unit 105.

The differentiating circuit 102 differentiates an absolute displacement detected by the potentiometer 86 to obtain a speed V (hereinafter occasionally referred to as "speed signal V"). The target displacement setting unit 103 receives the input of the speed signal V from the differentiating circuit 102 and the detection signal (input absolute displacement detected value A) from the potentiometer 86 to set a target displacement C (relative displacement) and inputs the target displacement C to the subtracting circuit 104.

The subtracting circuit 104 subtracts the relative displacement (relative displacement detected value B) detected by the relative displacement sensor 100 from the target displacement C output from the target displacement setting unit 103 (C−B) to obtain a deviation.

The control unit 105 receives the input of the deviation obtained by the subtracting circuit 104 and obtains an electric current to be supplied to the electric motor 64 to control the drive unit of the electric motor 64.

In this embodiment, the controller 92 controls, as shown in FIG. 3, the electric motor 64 and the transmission mechanism [comprising the rotation transmission mechanism 66 and the ball screw mechanism 65 (the nut member 68 and the screw shaft 70)] in the order mentioned, thereby allowing the booster piston 52 to be displaced (moved forward and backward) by the operation of the screw shaft 70 and the spring force of the return spring 81. The amount of displacement of the booster piston 52 caused in this way is added to the displacement of the input piston 58 to adjust the fluid pressure in the master cylinder. In addition, the relative displacement sensor 100 detects a difference (relative displacement detected value B) between the displacement of the booster piston 52 and the displacement detected by the potentiometer 86. The detected data (relative displacement detected value B) is fed back to the controller 92 and used to control the electric motor 64 and hence the fluid pressure.

That is, the controller 92 sets a target displacement C that makes variable the relative displacement relationship between the input piston 58 and the booster piston 52 according to the detection signal (input stroke; corresponding to the input absolute displacement detected value A) from the potentiometer 86 and controls the electric motor 64 so that the relative displacement relationship (relative displacement detected value B) between the input piston 58 and the booster piston 52 becomes equal to the target displacement C on the basis of the detection signal (relative displacement detected value B) from the relative displacement sensor 100.

The target displacement C is set as stated hereinbelow by using the previously-obtained target displacement calculation characteristic data shown in part (b) of FIGS. 4 to 10.

The controller 92 can perform constant boost control, variable boost control, jump in control, brake assist control, build-up control, regenerative cooperative control, deboost control and ineffective stroke reducing control by executing the above-mentioned program.

The constant boost control is a control method wherein the input piston 58 and the booster piston 52 are displaced as one unit (displaced with zero relative displacement so that the booster piston 52 is always at the above-described neutral position relative to the input piston 58) in the same way as stated above in the section entitled "Background Art". With the constant boost control method, assist stroke characteristics represented by the solid line in part (a) of FIG. 4 can be obtained. In part (a) of FIG. 4, the abscissa axis represents the stroke of the input piston 58 (hereinafter occasionally referred to as "input stroke"), and the ordinate axis represents the stroke of the booster piston (assist member) 52 (hereinafter occasionally referred to as "assist stroke"). The constant boost control allows, as shown in part (c) of FIG. 4, the fluid pressure generated in the master cylinder 2 to increase with the forward movement of the input piston 58 in the form of a quadratic curve, a cubic curve, or a multiple-order curve compounded of a quadratic or cubic curve and a curve of a higher order than them (these curves will hereinafter be referred to generically as "multiple-order curve").

Figure 4:
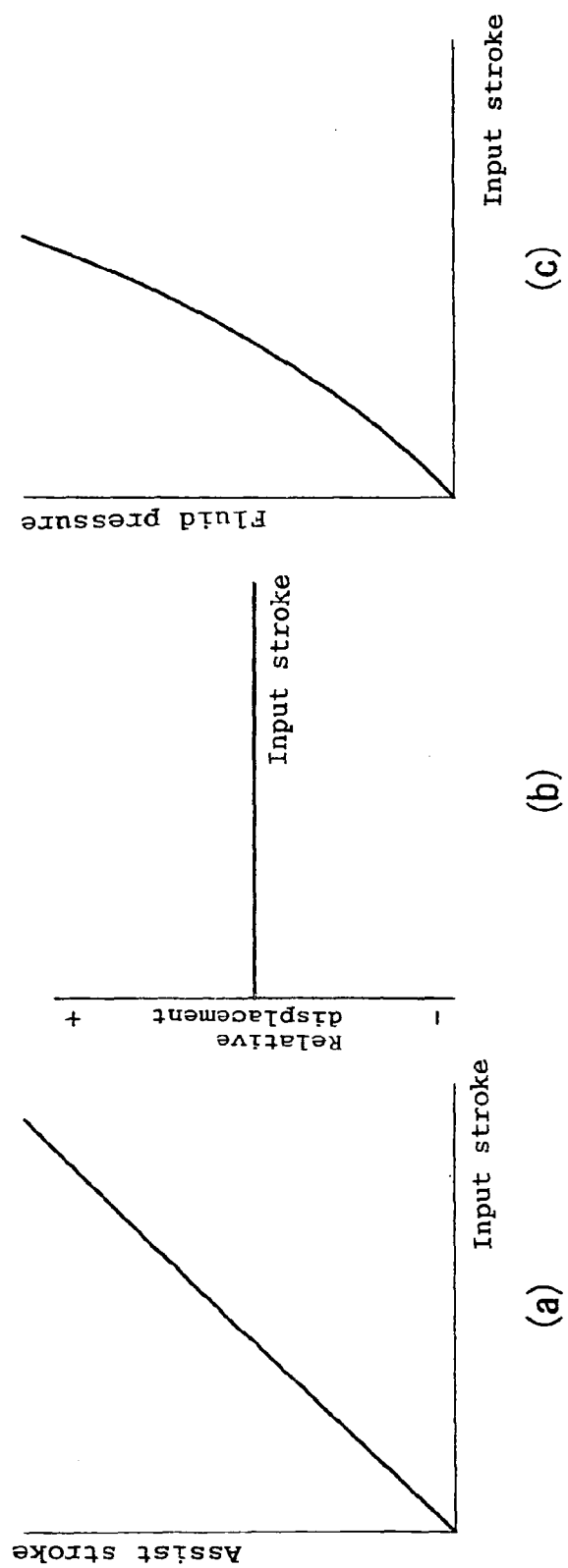
FIG. 4 is a graph in which: part (b) shows target displacement calculation characteristic data (input stroke-relative displacement characteristics) used for constant boost control that can be performed by the controller shown in FIG. 1; part (a) shows input stroke and assist stroke characteristic data corresponding to the target displacement calculation characteristic data in part (b); and part (c) shows the corresponding relationship between the input stroke and the fluid pressure to the target displacement calculation characteristic data in part (b).

The characteristics of the constant boost control represented by the characteristic data shown in part (a) of FIG. 4 and the characteristic data shown in part (c) of FIG. 4 can be expressed by target displacement calculation characteristic data shown in part (b) of FIG. 4, in which the abscissa axis represents the input stroke, and the ordinate axis represents the relative displacement between the input piston 58 and the booster piston 52. In part (b) of FIG. 4, the solid line represents the relative displacement between the input piston 58 and the booster piston 52. If the electric motor 64 is controlled so that the relative displacement between the input piston 58 and the booster piston 52 is always zero as shown by the solid line in part (b) of FIG. 4, fluid pressure characteristic shown in part (c) of FIG. 4 can be obtained.

The above-described constant boost control is similar to that stated in the section entitled "Background Art". The following is an explanation of various controls wherein the relative displacement relationship between the input piston 58 and the booster piston 52 is made variable, which is the characteristic feature of the invention of this application, i.e. variable boost control, jump in control, brake assist control, build-up control, regenerative cooperative control, and deboost control. It should be noted that the broke lines in parts (a), (b) and (c) of FIGS. 5 to 10 represent the characteristics of the constant boost control, shown in parts (a), (b) and (c) of FIG. 4, in which the input piston 58 and the booster piston 52 are displaced so that the relative displacement therebetween is zero at all times.

Figure 5:
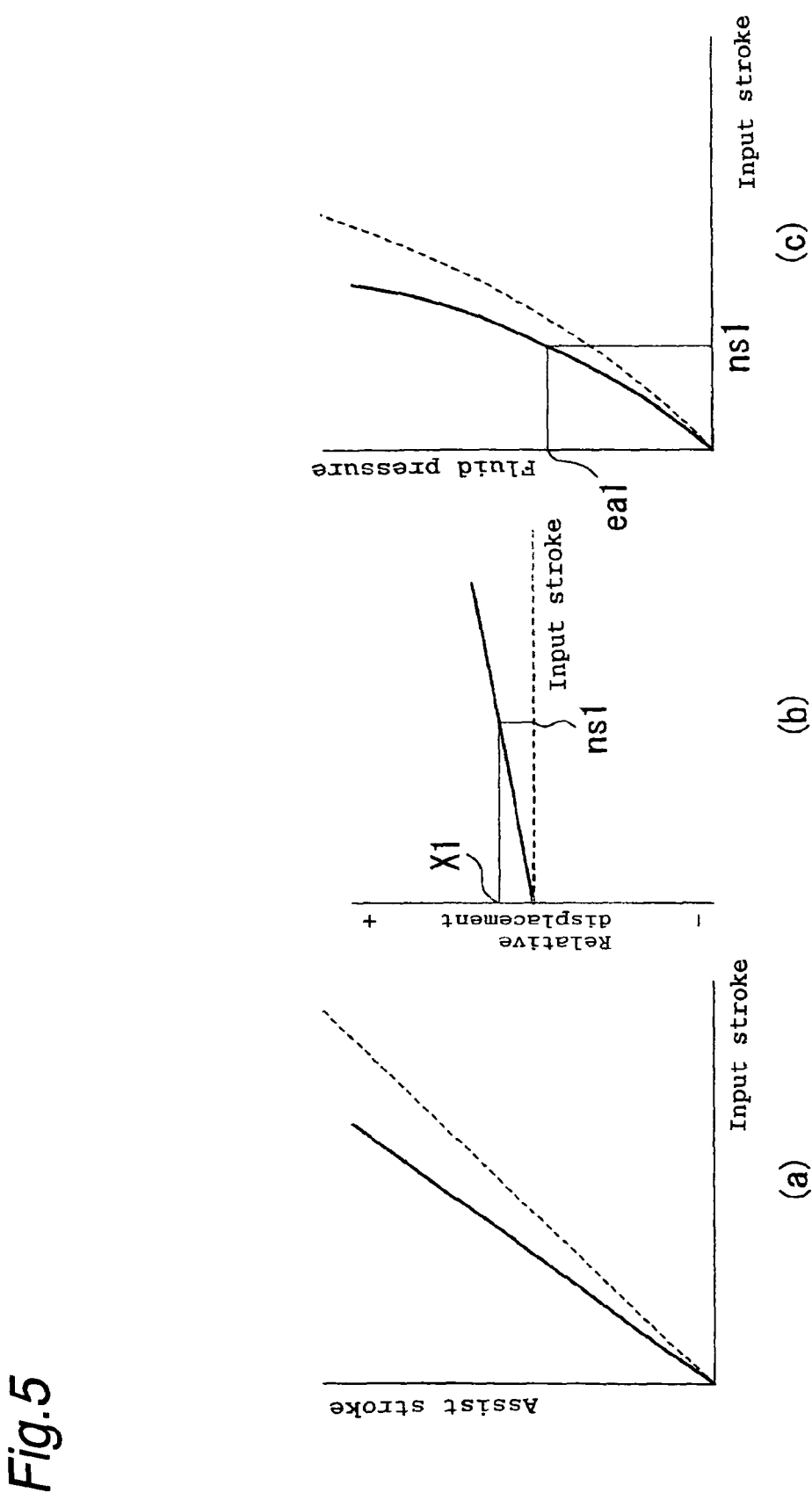
FIG. 5 is a graph in which: part (b) shows target displacement calculation characteristic data used for variable boost control performed by the controller shown in FIG. 1; and parts (a) and (c) show characteristic data corresponding to parts (a) and (c) of FIG. 4.

First, the variable boost control is a control method in which, as shown by the solid line in part (a) of FIG. 5, the forward movement of the booster piston 52 is accelerated relative to the forward movement of the input piston 58, so that the relative displacement between the booster piston 52 and the input piston 58 increases with the forward movement of the input piston 58, and the rate of the increase in fluid pressure generated in the master cylinder 2 according to the forward movement of the input piston 58 (i.e. the fluid pressure characteristics increasing in the form of a multiple-order curve) correspondingly increases as shown by the solid line in part (c) of FIG. 5.

The variable boost control may include controlling the electrically-operated actuator 53 so that the absolute displacement of the booster piston 52 becomes smaller than the absolute displacement of the input piston 58 as the input piston 58 moves in the direction for increasing the brake fluid pressure, in addition to the above-described control (i.e. controlling the electrically-operated actuator 53 so that the absolute displacement of the booster piston 52 becomes larger than the absolute displacement of the input piston 58 as the input piston 58 moves in the direction for increasing the brake fluid pressure).

The target displacement calculation characteristic data shown in part (b) of FIG. 5 is data obtained by performing verification corresponding to parts (a) and (c) of FIG. 5. For example, if the electric motor 64 is controlled so that one value (hereinafter occasionally referred to as "target displacement") X1 is determined as a relative displacement corresponding to one value ns1 of the input stroke, a fluid pressure ea1 of a magnitude corresponding to the target displacement X1 is generated in the master cylinder 2.

As shown in part (b) of FIG. 5, the relative displacement changes corresponding to the change of the input stroke, and this relative displacement is set as a target displacement. The fact that the target displacement C (relative displacement) is variable according to the stroke of the input piston 58 is equivalent to the limitation in claim 1 of "sets a target displacement that makes variable relative displacement relationship between said input member and said assist member". This applies not only to part (b) of FIG. 5 but also to part (b) in FIGS. 6 to 10.

The jump in control is a control method wherein the electrically-operated actuator 53 is controlled such that when the potentiometer 86 detects that the absolute displacement of the input piston 58 has moved from the initial position by a predetermined amount ns2, the booster piston 52 is started to be displaced so that the displacement of the booster piston 52 becomes equal to the displacement of the input piston 58 (i.e. the booster piston 52 is displaced with a zero relative displacement so that the input piston 58 assumes the neutral position relative to the booster piston 52), or so that the displacement of the booster piston 52 becomes larger than the displacement of the input piston 58. To implement the above-described control method in this embodiment, as shown in part (a) of FIG. 6, the booster piston 52 is not displaced until the input piston 58 has been displaced by a predetermined amount ns2. After the displacement of the input piston 58 by the predetermined amount ns2, the booster piston 52 is rapidly displaced. Thereafter, the booster piston 52 is displaced together with the input piston 58 as one unit. Consequently, as shown in part (c) of FIG. 6, no fluid pressure is generated in the master cylinder 2 until the input piston 58 has been displaced by the predetermined amount ns2, and after the displacement of the input piston 58 by the predetermined amount ns2, a fluid pressure is rapidly generated in the master cylinder 2, and the fluid pressure is increased in the form of a multiple-order curve with the forward movement of the input piston 58. In the foregoing description, control is performed such that after the booster piston 52 has been rapidly displaced after the displacement of the input piston 58 by the predetermined amount ns2, the booster piston 52 is displaced so as to assume the above-described neutral position relative to the input piston 58. In this regard, control may be performed such that the booster piston 52 is displaced so as to assume a position forward of the above-described neutral position relative to the input piston 58.

The above-described jump in control enables the vehicle driver to receive the feeling that the brake is working properly from a reaction on the brake pedal 8 caused by an increase in fluid pressure in the early stage of depressing the brake pedal 8. Hence, it is possible to give a favorable brake feeling to the driver.

Figure 7:
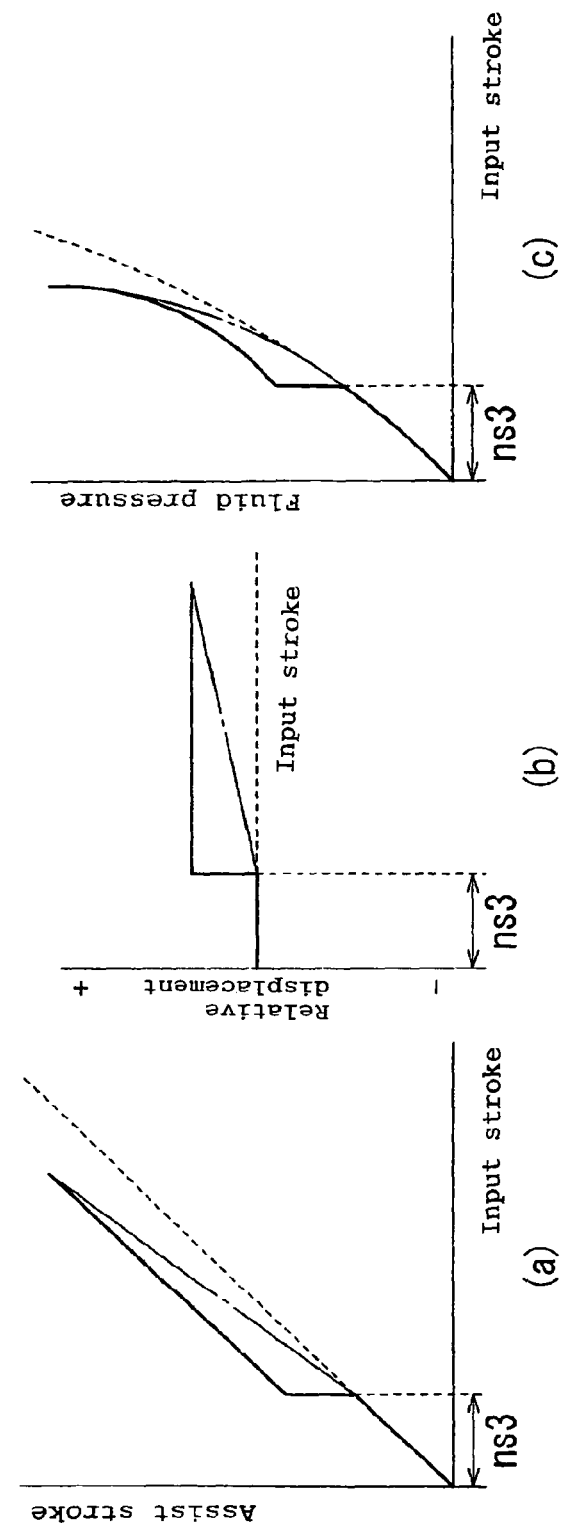
FIG. 7 is a graph in which: part (b) shows target displacement calculation characteristic data used for brake assist control performed by the controller 92 shown in FIG. 1; and parts (a) and (c) show characteristic data corresponding to parts (a) and (c) of FIG. 4.

In the brake assist control, as shown in part (a) of FIG. 7, as the input piston 58 moves forward, the booster piston 52 is displaced together with the input piston 58 as one unit until a first condition (input stroke response type brake assist control) is met such that the absolute displacement of the input piston 58 has reached a predetermined amount ns3 (here, the predetermined amount ns3 is larger than the predetermined amount ns2 used in the above-described jump in control) or until a second condition (input speed response type brake assist control) is met such that the speed of movement of the input piston 58 is judged to have reached a predetermined speed. After the first or second condition has been met, the electric motor 64 is operated, so that the booster piston 52 is further moved forward by an amount corresponding to an amount by which the motor 64 is operated. Consequently, as shown in parts (b) and (c) of FIG. 7, as the amount of the forward movement of the booster piston 52 caused by the operation of the electric motor 64 becomes larger than that of the forward movement of the input piston 58, the fluid pressure supplied to the master cylinder 2 increases in the form of a multiple-order curve.

The solid lines in FIG. 7 represent characteristics obtained in a case where the booster piston 52 is instantaneously moved forward by a predetermined amount of relative displacement after the first or second condition has been met, and thereafter, the booster piston 52 is moved synchronously with the movement of the input piston 58. The alternate long and short dash lines represent characteristics obtained when the above-described variable boost control is performed after the first or second condition has been met. The brake assist control enables the boost ratio to be changed to a larger one to apply emergency brake when a sudden braking operation by the vehicle driver is perceived. It should be noted that only either the first or second condition may be used. It is also possible to control such that the amount of movement of the booster piston 52 after the first or second condition has been met is maximized to apply full brake.

Figure 8:
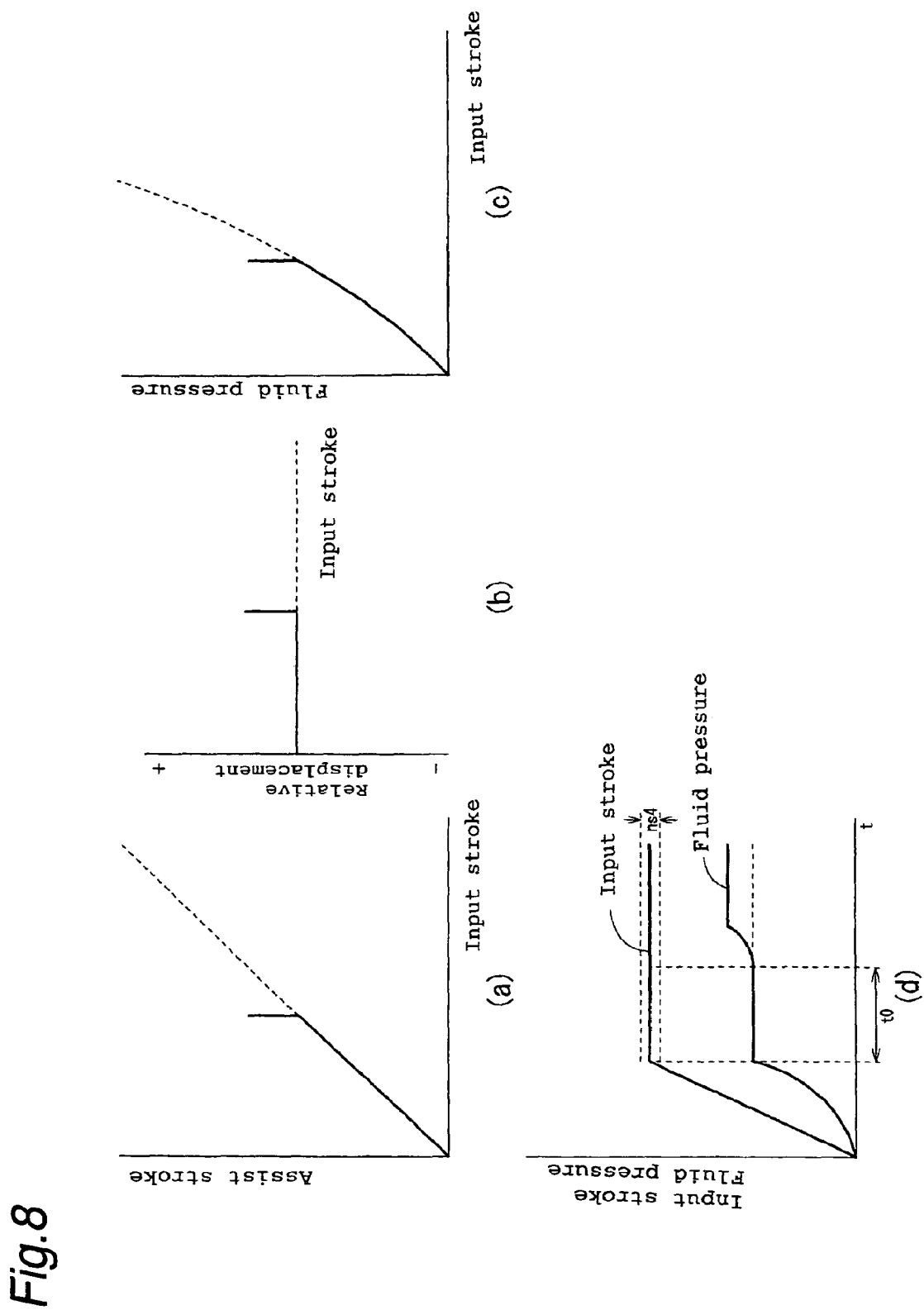
FIG. 8 is a graph in which: part (b) shows target displacement calculation characteristic data used for build-up control performed by the controller shown in FIG. 1; parts (a) and (c) show characteristic data corresponding to parts (a) and (c) of FIG. 4; and part (d) shows changes with time of the input stroke and the fluid pressure.

The build-up control is, as shown in FIG. 8, a control method wherein the electrically-operated actuator 53 is controlled so that the booster piston 52 is displaced relative to the input piston 58 by a predetermined amount of relative displacement in the direction for increasing the brake fluid pressure, as shown in part (b) of FIG. 8, when it is judged from the absolute displacement of the input piston 58 that the movement of the input piston 58 in the direction for increasing the brake fluid pressure has stopped, i.e. when it is judged that, as shown in part (d) of FIG. 8, the amount of movement of the input piston 58 is within a predetermined stroke width ns4, or the input speed V of the input piston 58 has a value near zero (not shown), and this state is judged to have continued for a predetermined time t0.

To implement the build-up control in this embodiment, as shown in part (a) of FIG. 8, when it is detected that the depression of the brake pedal has stopped, the booster piston 52 is gradually moved forward relative to the input piston 58, thereby allowing the fluid pressure generated in the master cylinder 2 to be gradually increased with the forward movement of the booster piston 52, as shown in part (d) of FIG. 8.

The above-described build-up control enables the vehicle driver to receive the feeling that the brake is working properly from a reaction on the brake pedal caused by an increase in fluid pressure when he or she stops depressing the brake pedal. Hence, it is possible to give a favorable brake feeling to the driver.

The regenerative cooperative control is a control method wherein the fluid pressure generated in the master cylinder 2 is reduced by an amount corresponding to a braking (regenerative braking) force generated during regeneration of a power motor of a hybrid automobile. As shown in part (a) of FIG. 9, the booster piston 52 is moved forward with a delay to the forward movement of the input piston 58. In other words, the booster piston 52 is moved backward relative to the input piston 58. Thus, as shown in part (c) of FIG. 9, the rate of multiple-order curve-like increase in fluid pressure generated in the master cylinder 2 is reduced, thereby reducing the fluid pressure by an amount corresponding to the regenerative braking force.

Figure 9:
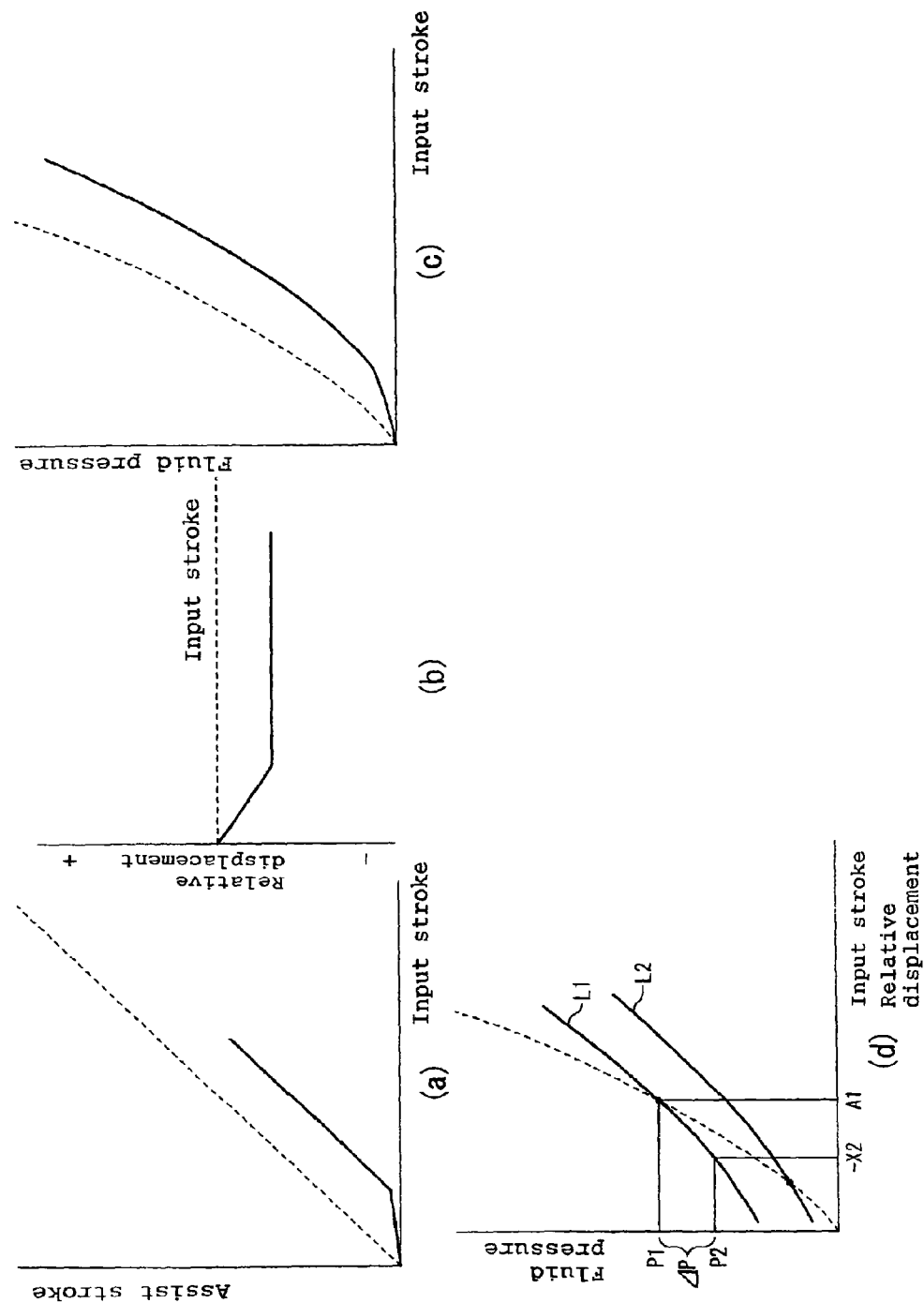
FIG. 9 is a graph in which: part (b) shows target displacement calculation characteristic data used for regenerative cooperative control performed by the controller shown in FIG. 1; and parts (a) and (c) show characteristic data corresponding to parts (a) and (c) of FIG. 4.

As shown in part (b) of FIG. 9, the relative displacement increases in the minus direction (i.e. the direction in which the booster piston 52 moves backward as the input piston 58 moves forward) with the change of the input stroke and becomes constant when the spring 85A has fully contracted. In other words, control is performed such that the booster piston 52 moves backward as the input piston 58 moves forward, and when the spring 85A has fully contracted, the booster piston 52 moves forward together with the input piston 58. It should be noted that the relative displacement in this case changes according to the regenerative braking force. Part (b) of FIG. 9 merely shows one example of the change of the relative displacement when the regenerative cooperative control is performed.

The above-described regenerative cooperative control enables a fluid pressure to be generated in the master cylinder 2 according to the regenerative braking force and hence can give a comfortable brake feeling to the driver.

Figure 10:
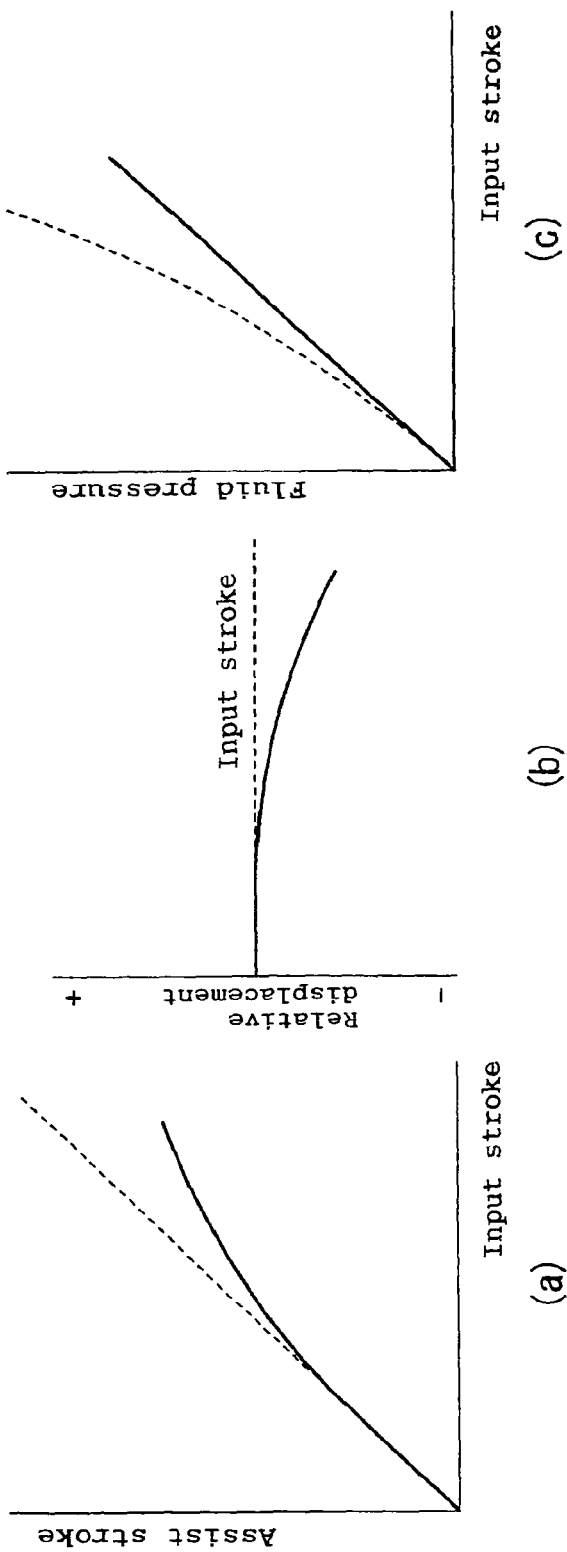
FIG. 10 is a graph in which: part (b) shows target displacement calculation characteristic data used for deboost control performed by the controller shown in FIG. 1; and parts (a) and (c) show characteristic data corresponding to parts (a) and (c) of FIG. 4.

The deboost control is a control method wherein, as shown in part (a) of FIG. 10, the booster piston 52 is moved backward relative to the input piston 58, thereby obtaining characteristics with which the fluid pressure generated in the master cylinder 2 increases in direct proportion to the stroke of the input piston 58, as shown in part (c) of FIG. 10. As shown in part (b) of FIG. 10, after the input piston 58 has moved forward to a certain extent, the relative displacement gradually increases in the form a quadratic curve in the minus direction (i.e. the direction in which the booster piston 52 moves backward as the input piston 58 moves forward). In other words, control is performed such that after the booster piston 52 has moved forward to a certain extent with the forward movement of the input piston 58 while keeping the neutral position relative to the input piston 58, the booster piston 52 gradually moves backward.

The controller 92 executes the program according to the detection signal from the potentiometer 86 and the detection signal from the relative displacement sensor 100. In the course of executing the program, the controller 92 selectively uses the characteristic data shown in part (b) of FIGS. 4 to 10 and in part (d) of FIG. 9 to perform computation and control shown in the flowcharts of FIGS. 11 to 17 (described later). It should be noted that the characteristic data shown in part (b) of FIGS. 5 to 10 and in part (d) of FIG. 9 is merely one example. The characteristics each change according to various conditions.

As has been stated above, the displacement (forward and backward movement) of the booster piston 52 is added to the displacement of the input piston 58 to adjust the fluid pressure in the master cylinder. The fluid pressure adjustment is performed with the pressure equilibrium relationship represented by Equation (1).

Figure 2:
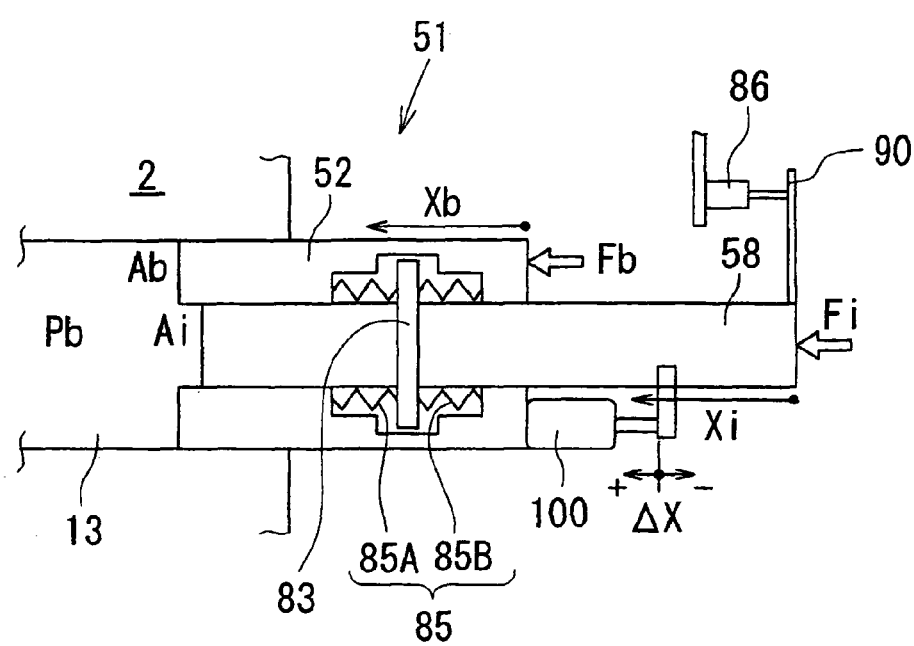
FIG. 2 is a schematic view for explaining pressure equilibrium in the electrically actuated booster shown in FIG. 1.

Each element in the pressure equilibrium equation (1) is, as shown also in FIG. 2, as follows.

Pb: the brake fluid pressure in the pressure chamber (primary chamber) 13 in the master cylinder 2;
Fi: input thrust;
Fb: booster thrust;
Ai: the pressure-receiving area of the input piston 58;
Ab: the pressure-receiving area of the booster piston 52;
K: spring constant of the springs 85 (85A and 85B);
$\Delta X$: the relative displacement between the input piston 58 and the booster piston 52.

The relative displacement $\Delta X$ is defined as $\Delta X = Xi - Xb$, where Xi is the displacement of the input piston 58, and Xb is the displacement of the booster piston 52. Accordingly, $\Delta X$ is zero at the neutral position of the relative movement, and has a positive sign in the direction in which the booster piston 52 moves backward relative to the input piston 58 and a negative sign in the direction opposite to the above. It should be noted that in the pressure equilibrium equation (1) sliding resistance of seals is ignored. In the pressure equilibrium equation (1), the booster thrust Fb can be estimated from the current value of the electric motor 64.

$$Pb = (Fi - K \times \Delta X)/Ai = (Fb + K \times \Delta X)/Ab \tag{1}$$

Meanwhile, the boost ratio $\alpha$ is given by the following Equation (2). Accordingly, if Pb in the pressure equilibrium equation (1) is substituted into Equation (2), the boost ratio $\alpha$ is given by the following Equation (3).

$$\alpha = Pb \times (Ab + Ai)/Fi \tag{2}$$

$$\alpha = (1 - K \times \Delta X/Fi) \times (Ab/Ai + 1) \tag{3}$$

In this case, to perform the constant boost control, which is the background art of the present invention, the rotation of the electric motor 64 is controlled (feedback control) so that the relative displacement $\Delta X$ becomes zero on the basis of the detection result of the potentiometer 86. Consequently, the boost ratio $\alpha$ is given by $\alpha = Ab/Ai + 1$ and thus uniquely determined by the pressure-receiving area Ab of the booster piston 52 and the pressure-receiving area Ai of the input piston 58 (FIG. 4) in the same way as vacuum boosters and the background art.

In contrast to the above, if the relative displacement $\Delta X$ is set at a negative predetermined value and the rotation of the electric motor 64 is controlled so that the relative displacement $\Delta X$ becomes equal to the above-described predetermined value, i.e. so that as the input piston 58 moves in the direction for increasing the brake fluid pressure, the absolute displacement of the booster piston 52 becomes larger than the absolute displacement of the input piston 58, the boost ratio $\alpha$ becomes (1−K×ΔX/Fi) times as large. In other words, the boost ratio becomes variable and the electrically-operated actuator 53 functions as a boost source. Thus, it becomes possible to reduce the brake pedal depressing force to a considerable extent.

The controller 92 executes the flowcharts of FIGS. 11 to 17 to perform computation and control, as stated above. The computation and control contents will be explained below with reference to FIGS. 11 to 17.

Figure 11:
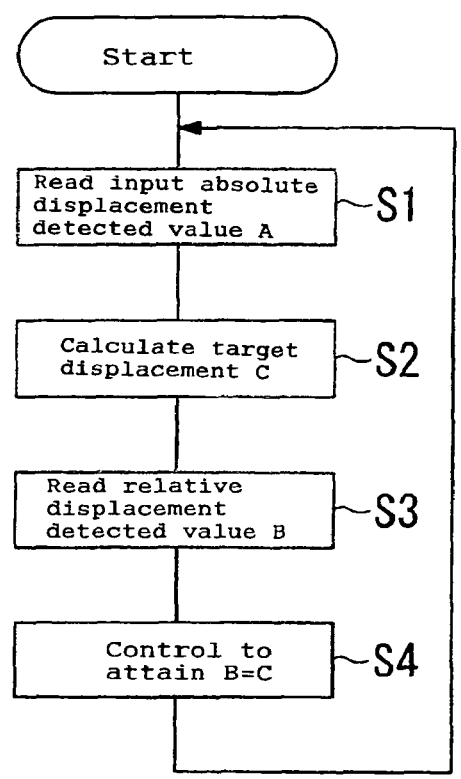
FIG. 11 is a flowchart showing a basic flow to explain the operation of the electrically actuated booster in FIG. 1.

The controller 92 executes at a predetermined cycle a basic flow including steps S1 to S4 shown in FIG. 11.

At step S1 in FIG. 11, the controller reads an input absolute displacement detected value A detected by the potentiometer 86. At step S2 subsequent to step S1, a target displacement C based on the input absolute displacement detected value A is calculated by using the target displacement calculation characteristic data shown in part (b) of FIGS. 5 to 10.

At step S3 subsequent to step S2, the controller reads a relative displacement detected value B detected by the relative displacement sensor 100.

At step S4 subsequent to step S3, the electric motor 64 and the transmission mechanism are controlled so that the relative displacement detected value B becomes equal to the target displacement C (B=C or C−B=0).

Control is performed by carrying out each step as stated above. In the variable boost control, the jump in control and the input stroke response type brake assist control, the target displacement C is calculated depending on the input stroke. Therefore, control can be performed by executing the above-described basic flow. In the input speed response type brake assist control and the build-up control, the target displacement C is calculated depending on the input speed and time in addition to the input stroke. In the regenerative cooperative control, the target displacement C is calculated depending on the regenerative braking force. For these control methods, control cannot be performed simply by executing the basic flow, in which the target displacement C is calculated depending on only the input stroke. Therefore, the flowcharts shown in FIGS. 12 to 15 are executed to implement the above-described control methods.

Figure 12:
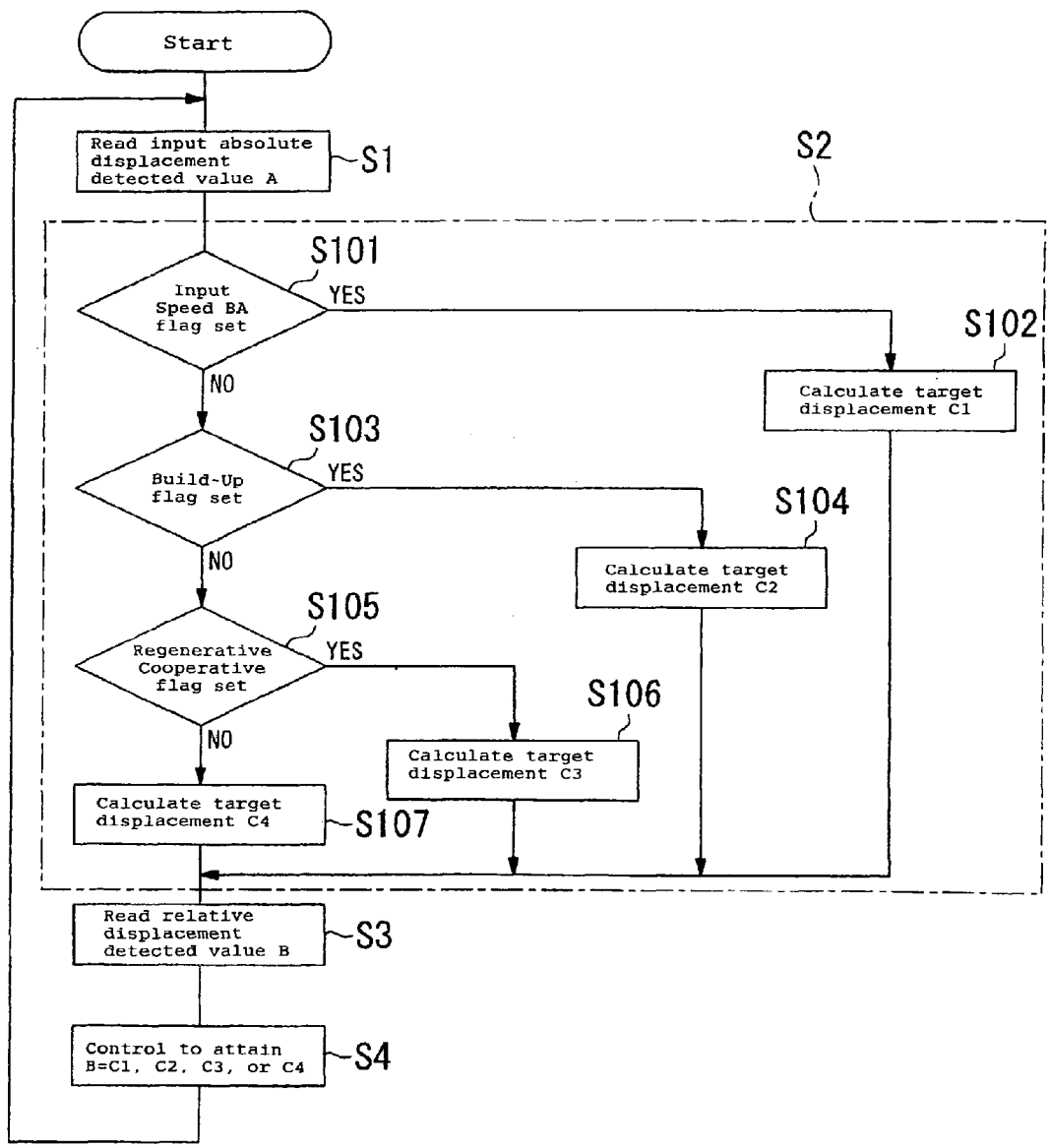
FIG. 12 is a flowchart of a modification of the basic flow shown in FIG. 11, in which the contents of step S2 of the basic flow have been changed to make the flow compatible with various control processes.

The flowchart of FIG. 12 has steps S101 to S107 in place of step S2 of the basic flow shown in FIG. 11.

Step S101 is executed subsequently to step S1, as shown in FIG. 12, to judge whether or not there is an Input Speed BA flag that is generated by an Input Speed BA flag generation flow shown in FIG. 13, which is running in parallel to this flow. If "YES" is the answer at step S101, a target displacement C1 is calculated (step S102) by using the target displacement calculation characteristic data for [Brake Assist Control] shown in part (b) of FIG. 7, etc., and the process proceeds to step S3.

Figure 14:
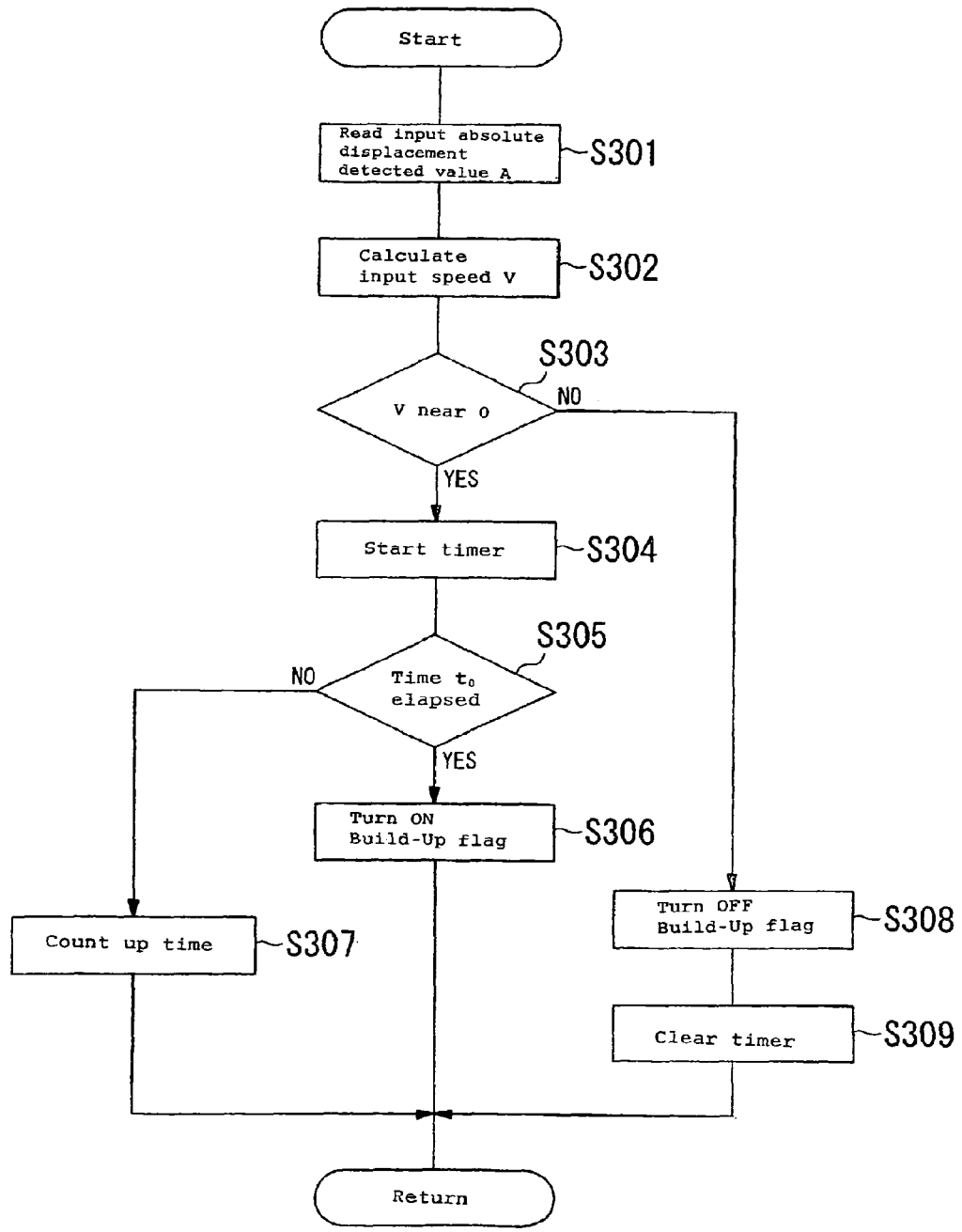
FIG. 14 is a flowchart showing a Build-Up flag generation flow executed in parallel to the flow of FIG. 12 in association with step S103 in FIG. 12.

If "NO" is the answer at step S101, it is judged (step S103) whether or not there is a Build-Up flag that is generated by a Build-Up flag generation flow shown in FIG. 14, which is running in parallel to this flow. If "YES" is the answer at step S103, a target displacement C2 is calculated (step S104) by using the target displacement calculation characteristic data for [Build-Up Control] shown in part (b) of FIG. 8, etc., and the process proceeds to step S3.

Figure 15:
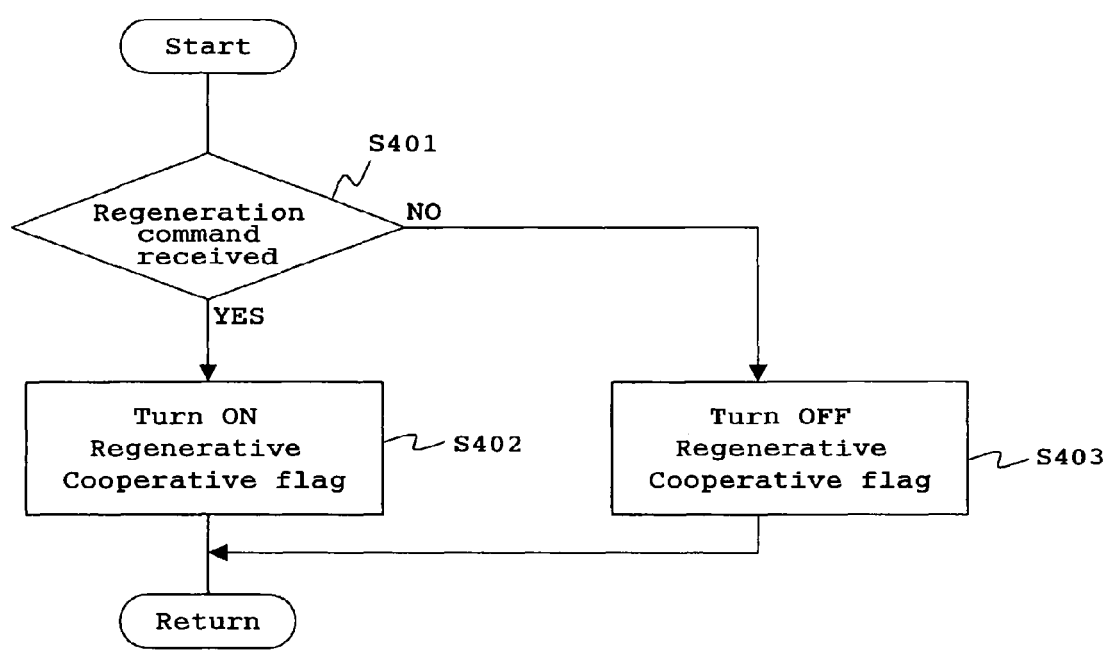
FIG. 15 is a flowchart showing a Regenerative Cooperative flag generation flow executed in parallel to the flow of FIG. 12 in association with step S105 in FIG. 12.

If "NO" is the answer at step S103, it is judged (step S105) whether or not there is a Regenerative Cooperative flag that is generated by a Regenerative Cooperative flag generation flow shown in FIG. 15, which is running in parallel to this flow. If "YES" is the answer at step S105, a target displacement C3 is calculated (step S106) by using the target displacement calculation characteristic data for [Regenerative Cooperative Control] shown in part (b) of FIG. 9, etc., and the process proceeds to step S3.

If "NO" is the answer at step S105, a target displacement C4 is calculated (step S107) by using the target displacement calculation characteristic data for [Variable Boost Control] shown in part (b) of FIG. 5, etc., and the process proceeds to step S3. In this embodiment, the order of execution of steps S101, S103 and S105 is determined so that a control process having a higher emergency level is preferentially executed. However, in a case where these steps can be carried out in any order, for example, step S103 may be executed after step S105.

Figure 6:
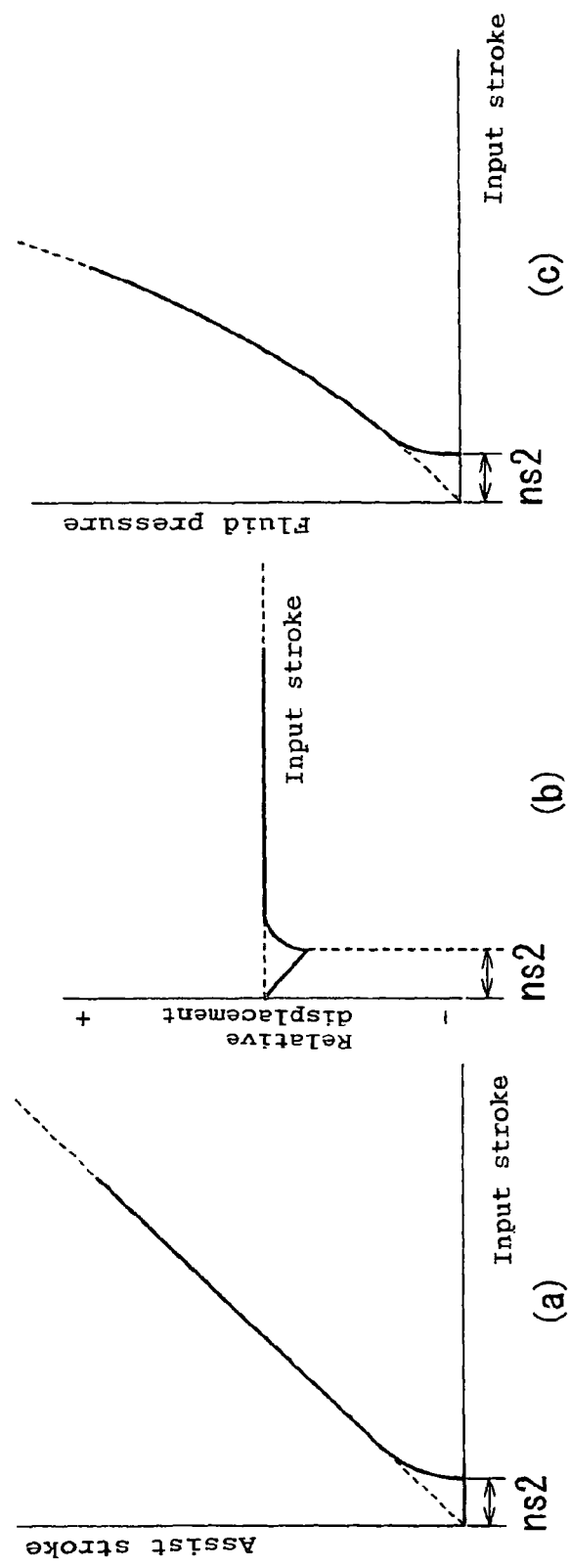
FIG. 6 is a graph in which: part (b) shows target displacement calculation characteristic data used for jump in control performed by the controller shown in FIG. 1; and parts (a) and (c) show characteristic data corresponding to parts (a) and (c) of FIG. 4.

Although in this embodiment the target displacement calculation characteristic data for [Variable Boost Control] shown in part (b) of FIG. 5 is used to calculate a target displacement C4 at step S107, the target displacement calculation characteristic data for [Jump In Control] shown in part (b) of FIG. 6 may be used in place of the characteristic data for [Variable Boost Control]. It is also possible to use the target displacement calculation characteristic data for [Brake Assist Control] shown in part (b) of FIG. 7 to perform the input stroke response type brake assist control. It is also possible to use combined data comprising those shown in respective parts (b) of FIGS. 5 and 6, or combined data comprising those shown in respective parts (b) of FIGS. 5 and 7, or combined data comprising those shown in respective parts (b) of FIGS. 6 and 7, or combined data comprising all data shown in respective parts (b) of FIGS. 5 to 7.

Figure 13:
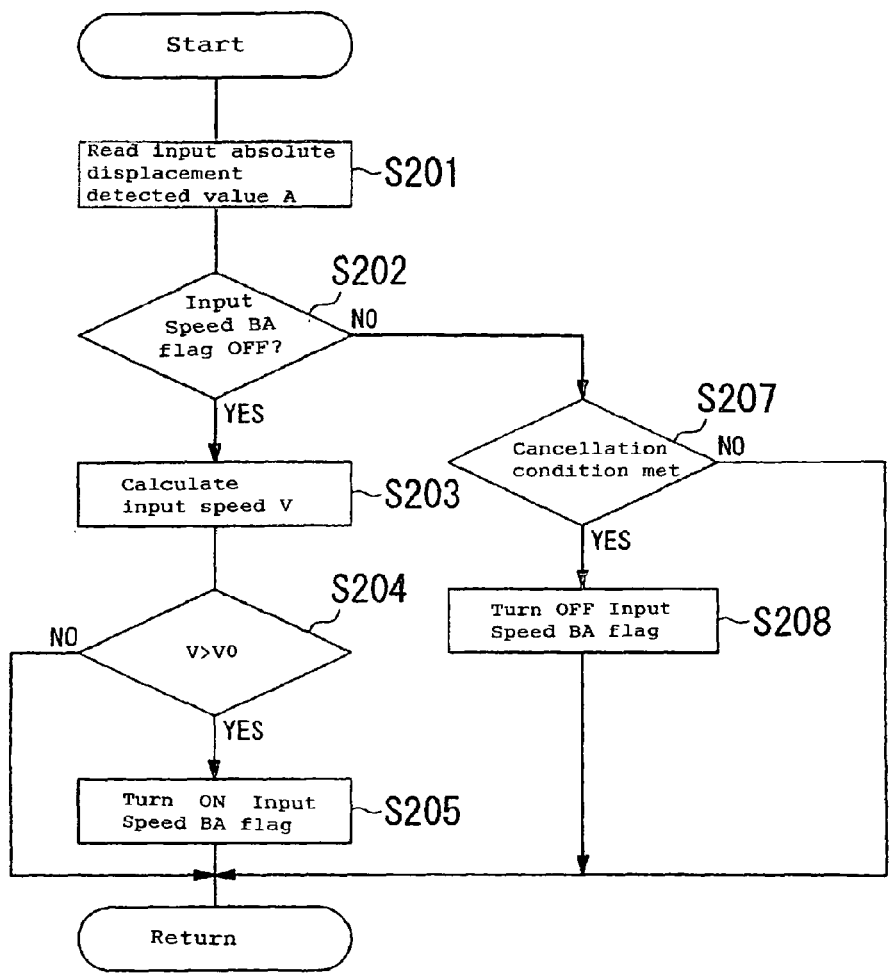
FIG. 13 is a flowchart showing an Input Speed BA flag generation flow executed in parallel to the flow of FIG. 12 in association with step S101 in FIG. 12.

The Input Speed BA flag generation flow shown in FIG. 13, the Build-Up flag generation flow shown in FIG. 14, and the Regenerative Cooperative flag generation flow shown in FIG. 15 are executed in parallel to the above-described flow shown in FIG. 12.

In the Input Speed BA flag generation flow, as shown in FIG. 13, an input absolute displacement detected value A detected by the potentiometer 86 is read (step S201).

Next, it is checked whether or not the Input Speed BA flag is off (step S202). If "YES" is the answer at step S202, an input speed V is calculated by the operation of the differentiating circuit 102 (step S203).

Subsequently, it is judged whether or not the input speed V is greater than a predetermined value V0 (step S204). If "YES" is the answer at step S204, it is judged that the vehicle driver wishes a sudden braking operation. Then, the Input Speed BA flag is turned on (step S205), and the process returns to repeat this flow. If "NO" is the answer at step S204, the process returns to repeat this flow.

If "NO" is the answer at step S202, it is judged whether or not the brake assist control that is in operation is now unnecessary from whether or not a brake assist control cancellation condition has been met (e.g. a predetermined condition that the input piston 58 has been moved backward, which can be judged from the input absolute displacement detected value A, or the vehicle speed has reached substantially zero) (step S207).

If "YES" is the answer at step S207, the brake assist control is unnecessary. Therefore, the Input Speed BA flag is turned off (step S208), and the process returns to repeat this flow. If "NO" is the answer at step S207, the process returns to repeat this flow in order to continue the brake assist control.

In the Build-Up flag generation flow, as shown in FIG. 14, an input absolute displacement detected value A detected by the potentiometer 86 is read (step S301).

Next, an input speed V is calculated by the operation of the differentiating circuit 102 (step S302).

Subsequently, it is judged whether or not the input speed V (may be not only a positive value but also a negative value) is a value near zero (step S303). If "YES" is the answer at step S303, time counting start or continuation processing using a timer is executed (step S304).

Next, it is judged (step S305) on the basis of the time counted by the timer whether or not a predetermined time t0 [see part (d) of FIG. 8] has elapsed since the input speed V was judged to be a value near zero.

If "YES" is the answer at step S305, the Build-Up flag is turned on (step S306), and the process returns to repeat this flow.

If "NO" is the answer at step S305, the time is counted up (step S307), and the process returns to enable the time counting to be continued.

If "NO" is the answer at step S303, the Build-Up flag is turned off (step S308), and the timer is cleared (step S309), and the process returns.

In the above-described control process, an input speed V is calculated at step S302, and whether or not the input speed V is a value near zero is judged at step S303 as a condition for turning on the Build-Up flag. In addition to this, it is also possible to judge whether or not the amount of movement of the input piston 58 is within a predetermined stroke width ns4 shown in part (d) of FIG. 8 on the basis of the input absolute displacement detected value A read at step S301.

In the Regenerative Cooperative flag generation flow, as shown in FIG. 15, it is judged (step S401) whether or not there is an input of a regeneration command (including a regeneration pressure reduction quantity ΔP) from a higher-level ECU (higher-level control system) concerning a braking operation performed by a regenerative braking system (not shown). If "YES" is the answer at step S401, the Regenerative Cooperative flag is turned on (step S402), and the process returns.

If "NO" is the answer at step S401, the Regenerative Cooperative flag is turned off (step S403), and the process returns.

Figure 16:
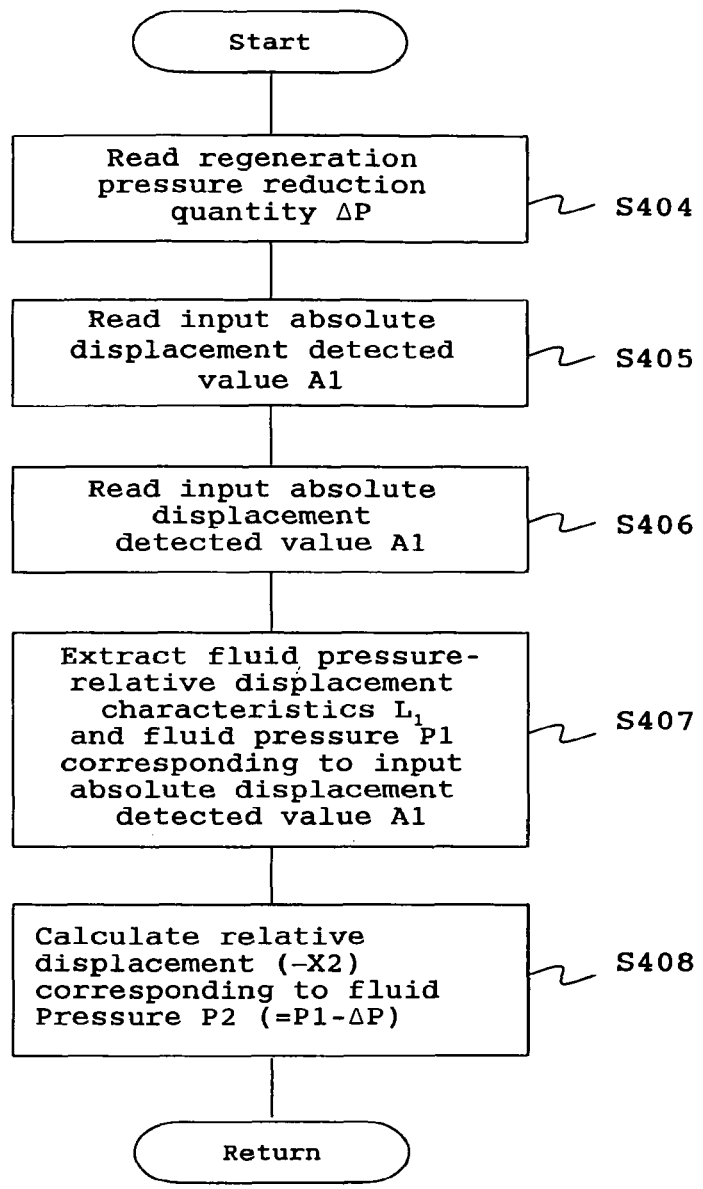
FIG. 16 is a flowchart showing a regenerative cooperative control target displacement setting flow equivalent to the contents of step S106 in FIG. 12.

When the Regenerative Cooperative flag is on, step S106 in FIG. 12 is executed to perform control as shown in FIG. 16: A regeneration pressure reduction quantity ΔP from the higher-level ECU is read (step S404). Next, an input absolute displacement detected value A detected by the potentiometer 86 is read (step S405). It should be noted that the detected value read at step S405 is denoted by A1 for the sake of explanation. Subsequently to step S405, a fluid pressure P1 corresponding to the input absolute displacement detected value A1 is calculated by using characteristic data represented by the dotted line in part (d) of FIG. 9 among characteristic data showing the relationship between the fluid pressure and the input stroke and relative displacement, and the solid-line characteristic data L1 is selected (step S406). It should be noted that the characteristics represented by the dotted line in part (d) of FIG. 9 are the same as the characteristics represented by the solid line in part (c) of FIG. 4. The solid-line characteristics in part (d) of FIG. 9 show the relationship between the fluid pressure and the relative displacement at a certain point on the dotted line characteristic curve. Although only two solid-line characteristic data L1 and L2 are shown in part (d) of FIG. 9, in actuality, there are a large number of data, one at each point on the dotted-line characteristic curve. Next, a relative displacement −X2 corresponding to a fluid pressure P2 obtained by subtracting ΔP from the fluid pressure P1 is calculated by using the solid-line characteristic data L1 selected above (step S407). The relative displacement −X2 indicates a relative displacement when the input absolute displacement detected value A1 is assumed to be a relative displacement of zero. Subsequently to step S407, −X2 is set as a target displacement C3 (step S408), and the process returns.

The regenerative cooperative control shown in FIG. 16 enables the electrically-operated actuator 53 to be controlled so that the booster piston 52 is displaced relative to the input piston 58 in the direction for reducing the brake fluid pressure as shown in part (c) of FIG. 9. Thus, a desired braking force can be generated with the brake fluid pressure reduced by an amount corresponding to the regenerative braking force.

Next, the ineffective stroke reducing control flow for eliminating the ineffective stroke of the master cylinder 2 will be explained with reference to FIG. 17. The ineffective stroke reducing control is executed in parallel or as an interrupt to the above-described flow shown in FIG. 11 or 12. Steps S502 and S503, step S504, step S505, and step S506, which constitute the ineffective stroke reducing control flow, respectively correspond to step S2, step S1, step S3, and step S4 of the basic flow shown in FIG. 11.

In the ineffective stroke reducing control flow, first, it is judged whether or not an accelerating operation is being conducted from whether or not there is an input of a detection signal relating to the operation of the accelerator pedal (step S501). If "NO" is the answer at step S501, i.e. acceleration is off, the target displacement C is set to a value C5 (step S502). If "YES" is the answer at step S501, i.e. acceleration is on, the target displacement C is set to a value zero (step S503). It should be noted that the value C5 is a relative displacement corresponding to the ineffective stroke of the master cylinder 2.

Subsequently to step S502 or S503, an input absolute displacement detected value A detected by the potentiometer 86 is read (step S504).

At step S505 subsequent to step S504, a relative displacement detected value B detected by the relative displacement sensor 100 is read.

Next, at step S506, the electric motor 64 is controlled so that the relative displacement detected value B becomes equal to the target displacement C, and the process returns.

In the master cylinder 2 of this embodiment, no brake fluid pressure is generated in the master cylinder 2 until the through-hole 18 has passed over the inner seal member 16 of the master cylinder 2 as a result of the forward movement of the booster piston 52, i.e. until the relief port 15 is closed. Hence, the cylinder stroke is ineffective during the initial period of booster operation. In this embodiment, however, the ineffective stroke reducing control shown in FIG. 17 is executed to control the electric motor 64 so as to move forward the booster piston 52 to a position past the seal member 16 before the brake is actually activated, thereby allowing elimination of the ineffective stroke. Although at the above-described step S501 whether or not there is an input of a detection signal relating to the operation of the accelerator pedal is judged, it should be noted that the present invention is not necessarily limited thereto. The control may be performed such that whether the engine throttle is open or closed is judged by using a throttle sensor, and when the engine throttle is closed, the target displacement C is set to a value C5, whereas when it is open, the target displacement C is set to zero.

In the foregoing explanation, the controller performs constant boost control, variable boost control, jump in control, brake assist control, build-up control, regenerative cooperative control, deboost control, and ineffective stroke reducing control. It should be noted that the controller may perform other control process. It is also possible to perform a part of the above-described control processes, including displacement control in which the relative displacement relationship between the input piston 58 and the booster piston 52 is made variable, such as the variable boost control, the brake assist control, etc.

The electrically actuated booster 50 arranged as stated above can obtain various brake characteristics, for example, brake assist control characteristics, by performing displacement control such that the relative displacement relationship between the input piston 58 and the booster piston 52 is variable according to a detection signal from the potentiometer 86. In view of the fact that the change in fluid pressure with the stroke is, in general, smaller in a low fluid pressure region than in a high fluid pressure region, the displacement control in which the stroke is controlled has the advantage that braking in the low fluid pressure region, which is frequently used for brakes, can be performed with high accuracy.

Further, because the input piston 58 is adapted to receive a part of a reaction caused by the brake fluid pressure, the following advantage can be obtained. That is, the fluid pressure generated according to the stroke of the input piston 58 can be increased or reduced by changing the relative positional relationship between the input piston 58 and the booster piston 52, and the brake pedal depressing force relative to the stroke of the input piston 58 can be changed according to the increase or reduction in fluid pressure. Thus, the relationship between the stroke of the input piston 58 on the one hand and on the other the fluid pressure and the brake pedal depressing force can be adjusted as desired.

In addition, a desired boost ratio is obtained by controlling the electrically-operated actuator 53 on the basis of a signal from the relative displacement sensor 100 so that the relative displacement between the booster piston 52 and the input piston 58 becomes equal to an arbitrary predetermined value. Accordingly, it becomes unnecessary to use a costly brake pedal depressing force sensor as required in the conventional technique. Thus, the cost can be reduced correspondingly. Further, it is possible to obtain a boost ratio larger or smaller than a boost ratio determined by the pressure-receiving area ratio between the booster piston 52 and the input piston 58 by controlling the electrically-operated actuator 53 so that the relative displacement between the booster piston 52 and the input piston 58 becomes equal to an arbitrary predetermined value. Hence, braking force based on the desired boost ratio can be obtained.

Next, an electrically actuated booster 50A according to a second embodiment of the present invention will be explained on the basis of FIGS. 18 to 20 and with reference to the first embodiment (FIGS. 1 to 17).

The electrically actuated booster 50A according to the second embodiment differs from the electrically actuated booster 50 according to the first embodiment as follows. In the electrically actuated booster 50A, as shown in FIGS. 18 and 19, the relative displacement sensor 100 is not used. A controller 92A is provided in place of the controller 92, and the controller 92A is provided with a relative displacement detecting circuit substituting for the relative displacement sensor 100 in the first embodiment. In addition, the electrically actuated booster 50A uses a basic flow shown in FIG. 20 in place of the basic flow (FIG. 11) in the first embodiment. It should be noted that the rest of the electrically actuated booster 50A is the same as in the first embodiment.

The relative displacement detecting circuit is provided in the controller 92A to detect a relative displacement [hereinafter occasionally referred to as "relative displacement detected value (D−A)"] between the booster piston 52 and the input piston 58 on the basis of an absolute displacement (hereinafter occasionally referred to as "assist absolute displacement detected value D") of the booster piston 52 relative to the vehicle body and a detection signal (input absolute displacement detected value A) from the potentiometer 86. The absolute displacement of the booster piston 52 is computed from the rotational displacement of the electric motor 64 detected by a resolver (assist absolute displacement detecting means) 91 provided to control the rotation of the electric motor 64. It should be noted that a potentiometer (displacement sensor) that detects the absolute displacement of the booster piston 52 may be used as the assist absolute displacement detecting means in place of the resolver 91 to obtain the absolute displacement of the booster piston 52.

Figure 20:
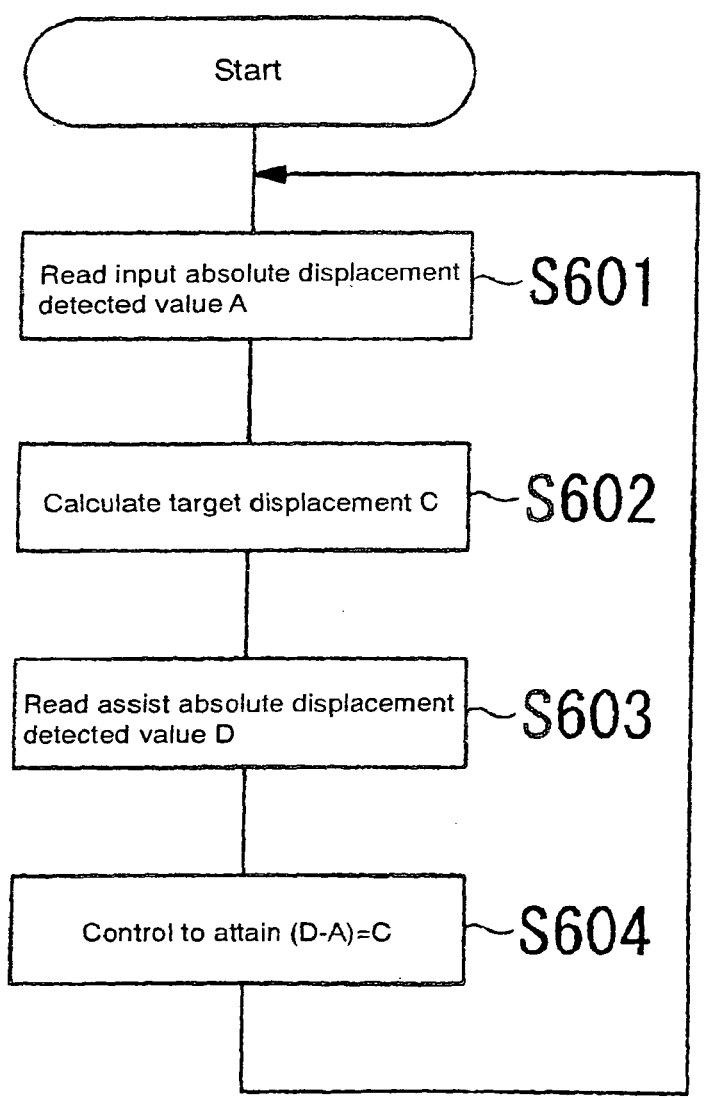
FIG. 20 is a flowchart showing a basic flow to explain the operation of the electrically actuated booster in FIG. 18.

The basic flow shown in FIG. 20 is provided with steps S603 and S604 in place of steps S3 and S4 in the basic flow shown in FIG. 11. At step S603, the above-described assist absolute displacement detected value D is read. At step S604, the electric motor 64 and the transmission mechanism [the rotation transmission mechanism 66 and the ball screw mechanism 65 (the nut member 68 and the screw shaft 70)] are controlled so that the relative displacement detected value (D−A) becomes equal to the target displacement C (D−A=C).

Figure 17:
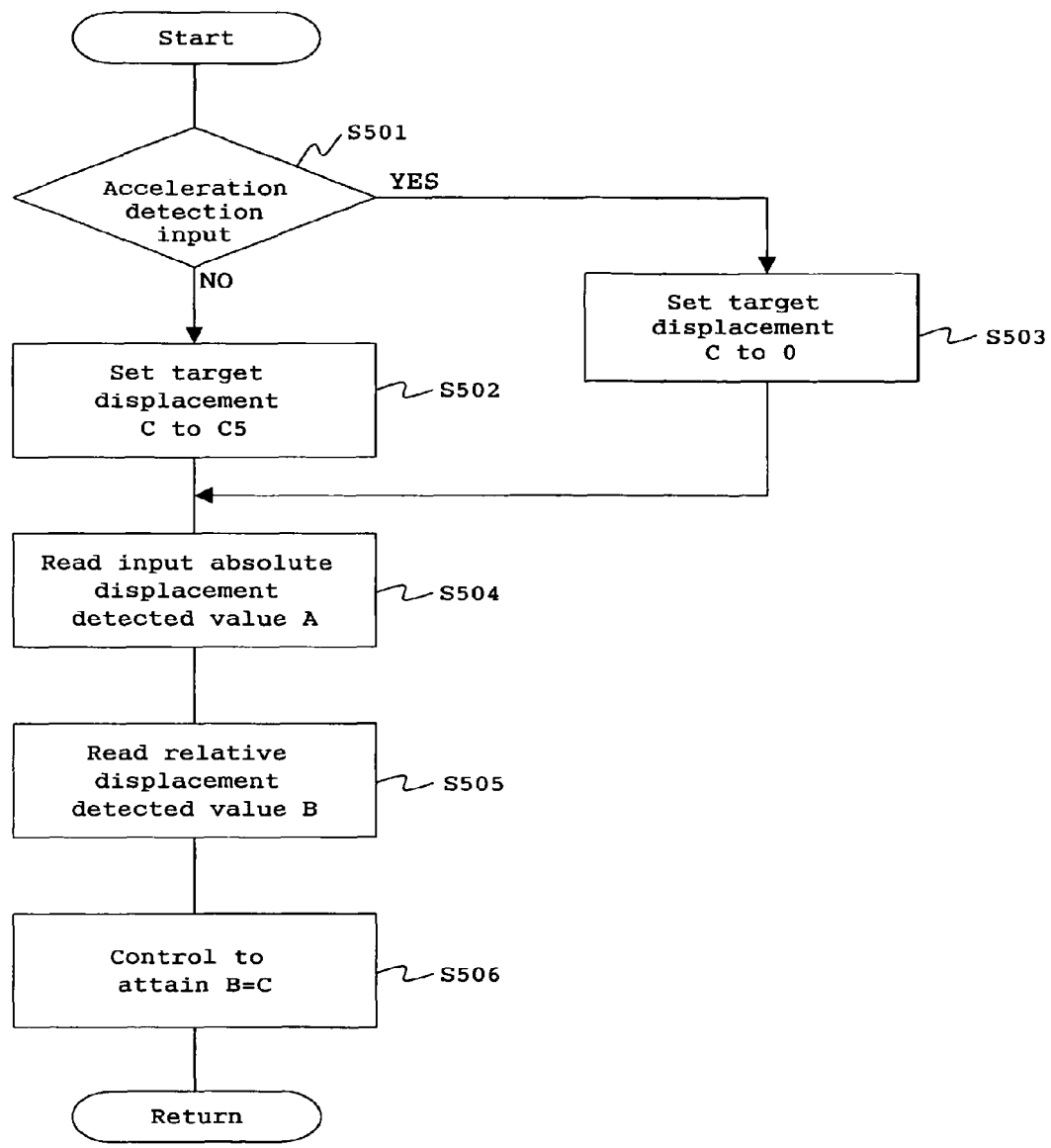
FIG. 17 is a flowchart showing an ineffective stroke reducing control flow used in the first embodiment.

It should be noted that control based on the flowcharts of FIGS. 12 to 17 can be performed by applying steps S603 and S604 in FIG. 20 to steps S3 and S4 in FIG. 12 and steps S505 and S506 in FIG. 17.

The second embodiment offers the same advantageous effects as those in the foregoing first embodiment.

Figure 21:
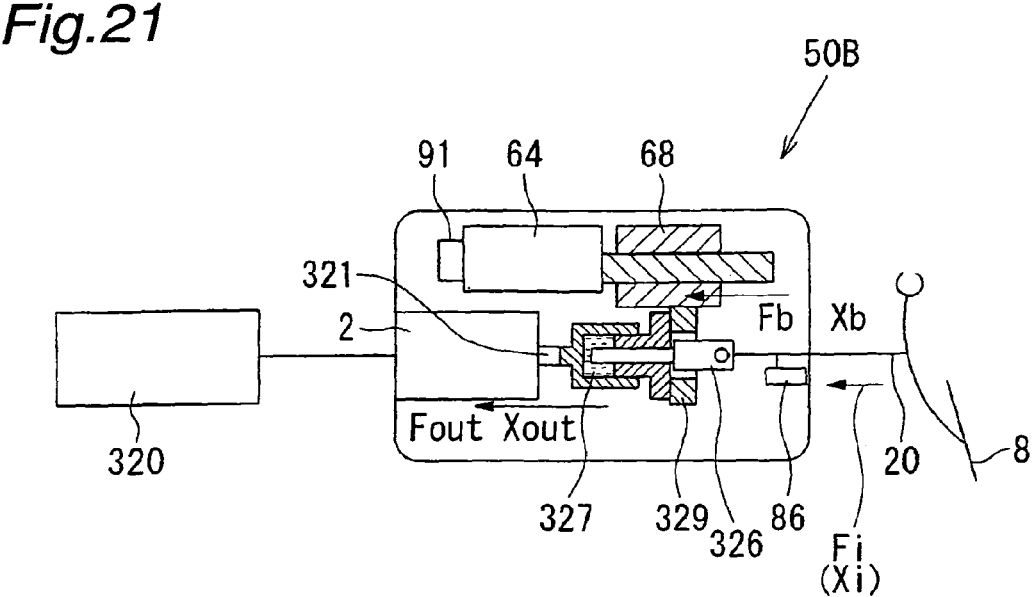
FIG. 21 is a diagram schematically showing a first modification of the second embodiment.

FIG. 21 shows an electrically actuated booster 50B as a modification of the second embodiment. The electrically actuated booster 50B differs to a considerable extent from the second embodiment in that an input piston (input member) 326 and a booster piston (assist member) 329 do not face the pressure chamber 13 of the tandem master cylinder 2, and in that no springs 85 are provided between the input piston 326 and the booster piston 329 to urge the input piston 326 toward the neutral position.

The input piston 326 is secured at one end thereof to a pedal-side input shaft 20. The other end of the input piston 326 and the other end of the booster piston 329 are inserted in a fluid pressure chamber 327 formed in one end portion of a primary piston 321 of the master cylinder 2 to seal a fluid therein. The input piston 326 is slidably disposed in the booster piston 329 driven by the electric motor 64 and the nut member 68. Both the input piston 326 and the booster piston 329 are sealed with seal members (not shown). Reference numeral 320 in FIG. 21 denotes a caliper provided for each wheel.

In the electrically actuated booster 50B shown in FIG. 21, the relationship between the input and output strokes when the input piston 326 and the booster piston 329 keep a constant relative displacement relationship may be given by the following Equation (4). The relationship between the input and the output may be given by the following Equation (5), where Ai and Ab are the respective areas of the input piston 326 and the booster piston 329 that face the fluid pressure chamber 327.

$$X\text{out}=Xi(=Xb) \quad (4)$$

$$F\text{out}=Fi(Ai+Ab)/Ai \quad (5)$$

where:
Xi is the input stroke;
Xout is the output stroke of the primary piston 321;
Fout is the output of the primary piston 321; and
Fi is the input of the pedal-side input shaft 20.

Hence, the boost ratio α, which is the ratio of the output Fout to the input Fi, may be given by the following Equation (6) from the above Equation (5).

$$\alpha = Fout/Fi = (Ai+Ab)/Ai \quad (6)$$

As will be clear from Equation (6), the boost ratio α in this modification is a constant value at all times.

Figure 22:
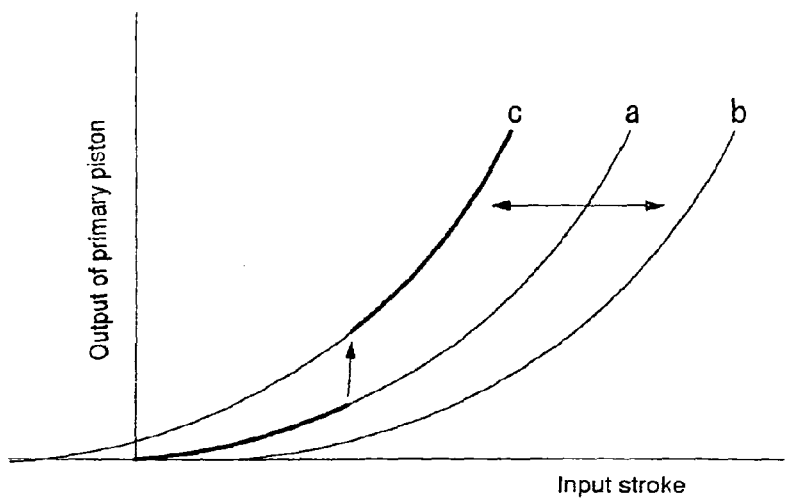
FIG. 22 is a diagram showing the relationship between the input stroke and the output when the relative displacement is shifted in the first modification of the second embodiment shown in FIG. 21.

The operation of the electrically actuated booster 50B shown in FIG. 21 is as follows. Even if the relative position between the input piston 326 and the booster piston 329 is shifted, if the position of the pedal-side input shaft 20 at that time is kept, the output Fout of the primary piston 321 increases or decreases by an amount corresponding to the relative movement of the booster piston 329 controlled by the electric motor 64. Consequently, the relationship between the input stroke Xi and the output Fout of the primary piston 321 is that shown in FIG. 22. That is, it is possible to obtain a desired relationship between the input stroke Xi and the output Fout and hence the fluid pressure (=output Fout/the area of the primary piston 321) by shifting the relative position among the curves a, b and c shown in FIG. 22. The curve a in FIG. 22 represents characteristics obtained when the input piston 326 and the booster piston 329 are at the neutral position. The curve b in FIG. 22 represents characteristics when the booster piston 329 is at a position moved backward relative to the input piston 326. The curve c in FIG. 22 represents characteristics when the booster piston 329 is at a position moved forward relative to the input piston 326. Let us consider a situation where the input piston 326 and the booster piston 329 are in the neutral position and the input piston 326 is moved forward by a certain amount in response to the depression of the brake pedal. In this state, if the booster piston 329 is moved forward by a predetermined amount with the input piston 326 kept at the present position, the characteristics in FIG. 22 shifts from a to c. Consequently, the output Fout and hence the fluid pressure that is generated according to the stroke of the input piston 326 increases. Thus, it is possible to realize short-stroke pedal feeling (i.e. a shorter stroke is required to obtain a given output). In addition, the reaction acting on the input piston 326 increases with the increase in fluid pressure, and hence the pedal depressing force for the stroke of the input piston 326 increases. Thus, the pedal depressing force for the stroke of the input piston 326 can also be changed and therefore can be adjusted as desired.

The operation is as follows. A relative displacement (D−A) between the pedal-side input shaft 20 (the input piston 326) and the booster piston 329 is obtained from the difference between the detection signals from the potentiometer 86 and the resolver 91, and control is performed so that the displacement of the booster piston 329 is larger than the displacement of the pedal-side input shaft 20 on the basis of a deviation of the relative displacement (D−A) from a predetermined target displacement. Thus, a favorable assist function can be realized.

It should be noted that in this modification no springs 85 are provided between the input piston 326 and the booster piston 329 to urge the input piston 326 toward the neutral position. However, if such springs 85 are provided, the control process shown in FIGS. 11 and 12 can be performed even if the other ends of the input piston 326 and the booster piston 329 do not face the pressure chamber 13 of the master cylinder 2 as shown in FIG. 21.

Figure 18:
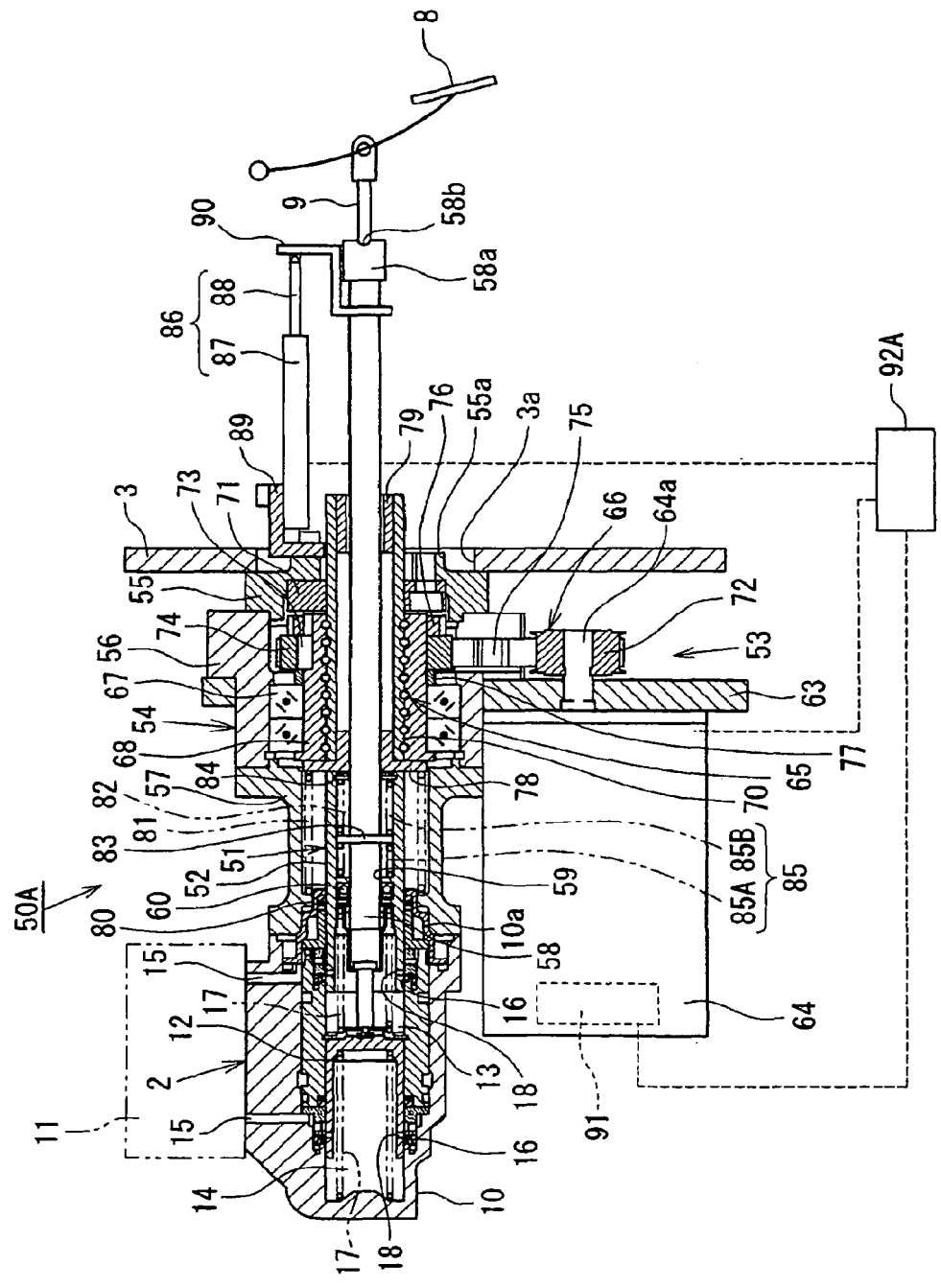
FIG. 18 is a sectional view showing an electrically actuated booster according to a second embodiment of the present invention.
Figure 19:
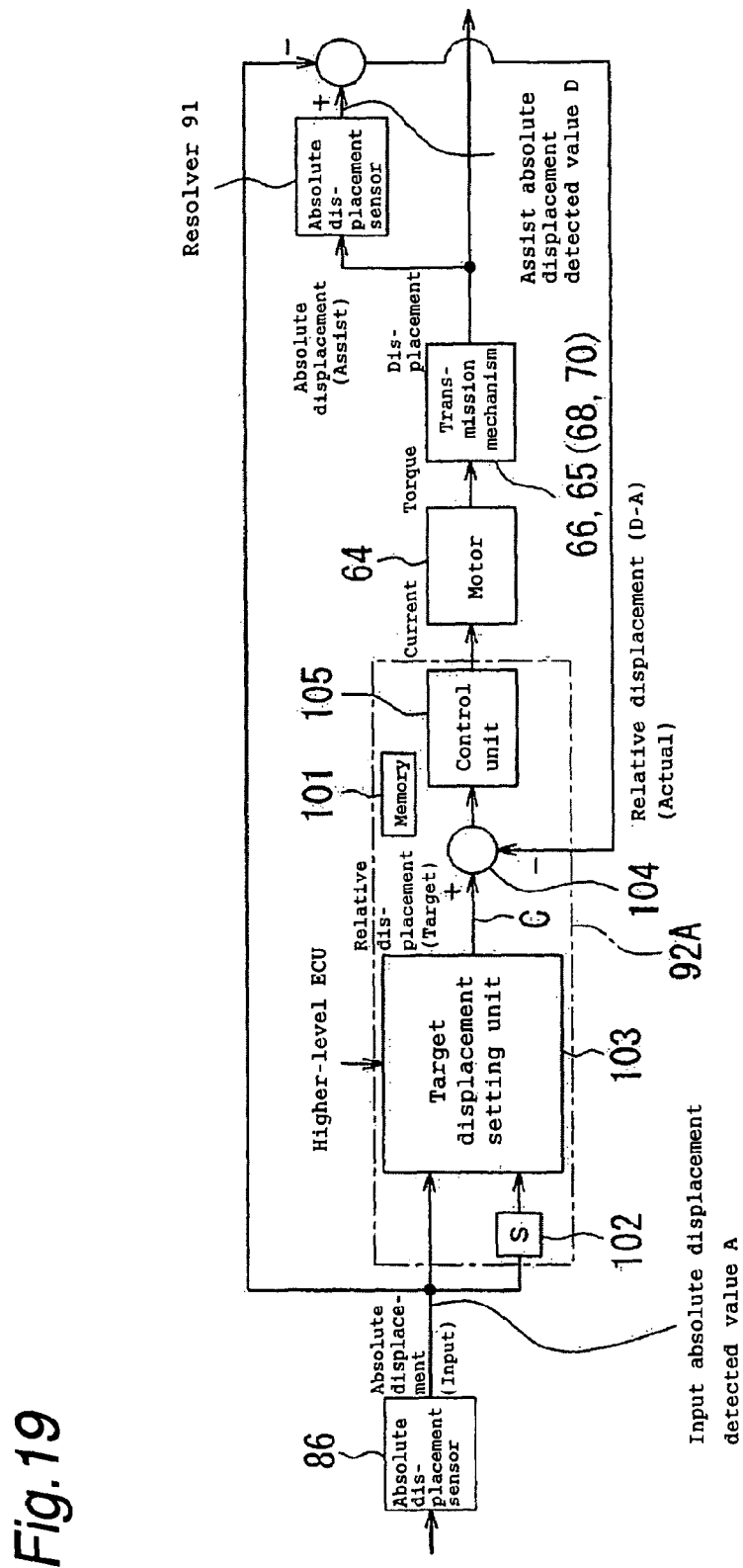
FIG. 19 is a block diagram showing a control system including a controller of the electrically actuated booster in FIG. 18.

In the first and second embodiments shown in FIG. 1 and FIGS. 18 and 21, the potentiometer 86 is used as the input absolute displacement detecting means to obtain an input absolute displacement, by way of example. In this regard, the following input absolute displacement detecting means may be used in place of the potentiometer 86. That is, an input absolute displacement may be estimated (obtained) by using a fluid pressure sensor that detects the fluid pressure in the pressure chamber 13 of the master cylinder 2, or a pedal depressing force sensor that detects a depressing force applied to the brake pedal 8, or a current sensor that detects an electric current supplied to the motor 64. The fact that the input absolute displacement can be estimated (obtained) by using the fluid pressure sensor, the pedal depressing force sensor or the current sensor will be explained below with reference to FIG. 23.

Figure 23:
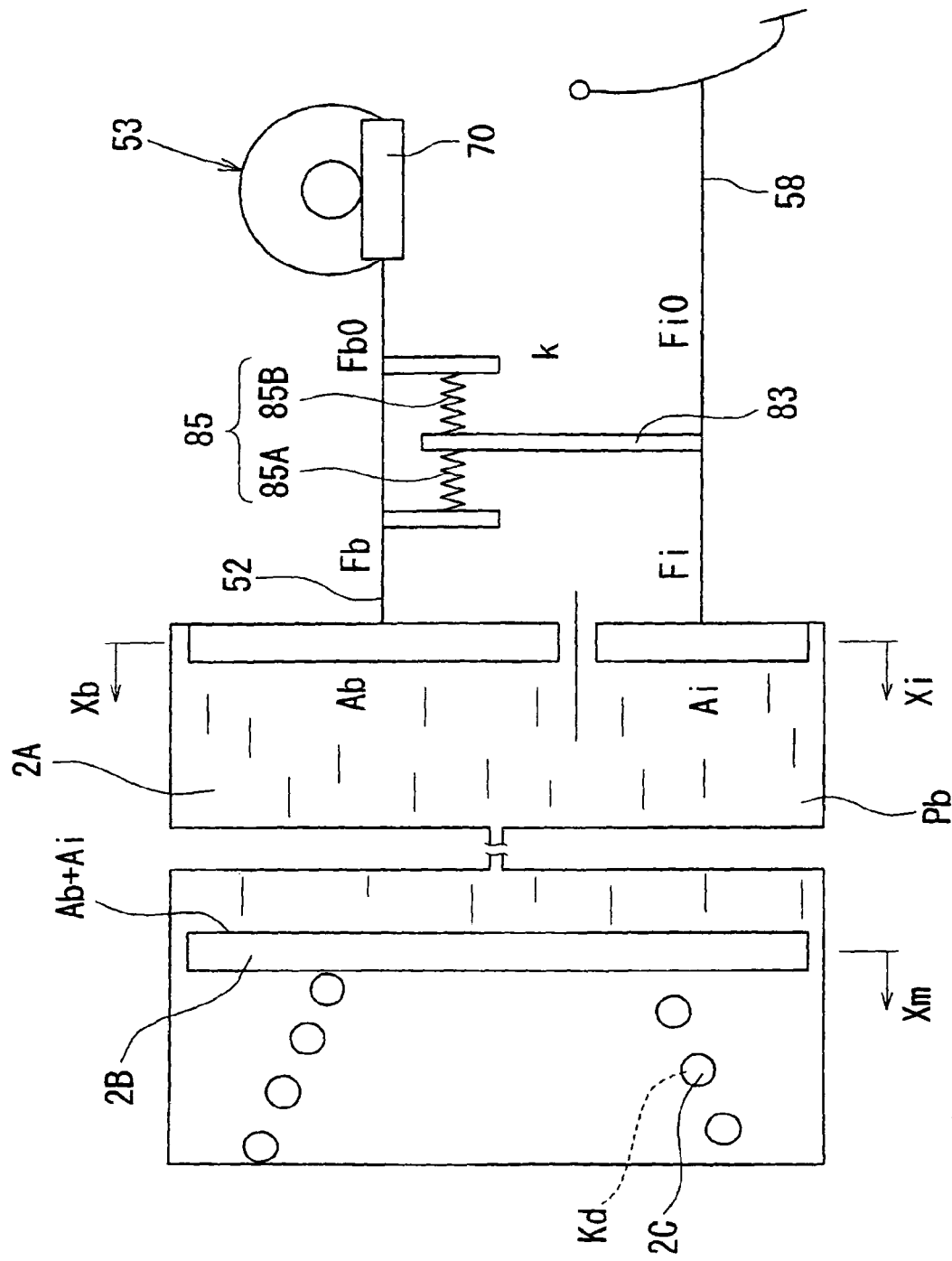
FIG. 23 is a schematic view for explaining the fact that a fluid pressure sensor, a brake pedal depressing force sensor or a current sensor can be used as input absolute displacement detecting means.

In FIG. 23, let us examine the above-described fact by replacing the relationship between the pressure chambers 13 and 14 of the master cylinder 2 and the rigidity of all load-side elements such as piping communicating with the pressure chambers 13 and 14 and disk brakes (i.e. relationship between the fluid quantity and the generated fluid pressure) with the relationship between a master cylinder pressure chamber 2A on the one hand and on the other the displacement Xm of a piston 2B having a cross-sectional area equal to the cross-sectional area (Ai+Ab) of the master cylinder pressure chamber 2A and the spring constant Kd of a spring element 2C attached to the piston 2B. In this case, the displacements (strokes) of the input piston 58 and the booster piston 52 are represented by Xi and Xb, respectively. The force (input thrust) finally generated by the input piston 58 at a part thereof facing the master cylinder pressure chamber 2A is represented by Fi, and the force (booster thrust) finally generated by the booster piston 52 at a part thereof facing the master cylinder pressure chamber 2A is represented by Fb.

The spring constant of the springs 85 (85A and 85B) is represented by K, the output of the screw shaft 70 by FbO and the brake pedal depressing force by FiO.

It should be noted that the relative displacement ΔX=Xi−Xb is already known because the first embodiment has the relative displacement sensor 100 and the second embodiment has the relative displacement detecting circuit in the controller 92A.

(A1) Regarding the fact that the input absolute displacement can be estimated (obtained) by using the fluid pressure sensor as the input absolute displacement detecting means:

The stroke Xi of the input piston 58 and the stroke Xb of the booster piston 52 cause a relative displacement of Xi−Xb=ΔX (known), and a fluid quantity change (volume change) ΔV given by Equation (7) occurs in the pressure chamber 2A correspondingly to the relative displacement.

Equation (7) may be changed to obtain Equation (8).

$$\Delta V = Xb \cdot Ab + Xi \cdot Ai = (Xi - \Delta X)Ab + Xi \cdot Ai = Xi(Ab+Ai) - \Delta X \cdot Ab \quad (7)$$

$$Xi = (\Delta V + \Delta X \cdot Ab)/(Ab+Ai) \quad (8)$$

Figure 24:
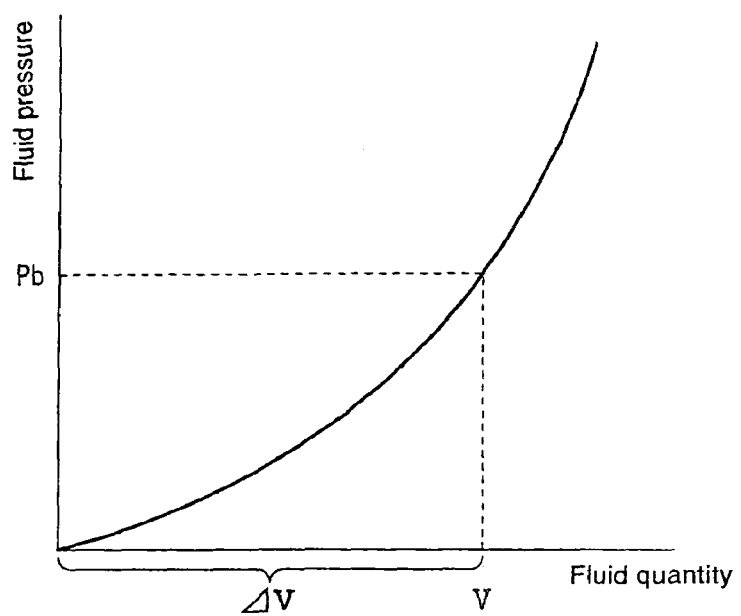
FIG. 24 is a diagram showing the relationship between the fluid quantity V and the fluid pressure Pb in a master cylinder pressure chamber 2A.

Meanwhile, the relationship between the fluid quantity (volume) V in the pressure chamber 2A and the fluid pressure Pb in the pressure chamber 2A may be represented by a multiple-order curve [Pb=f(V)] as shown in the graph of FIG. 24, in which the fluid quantity V is represented by the abscissa axis and the fluid pressure Pb by the ordinate axis. Because this corresponding relationship holds, if a fluid pressure Pb is detected, a fluid quantity V corresponding to the fluid pressure Pb can be obtained. A fluid quantity change (volume change) ΔV when the input piston 58 and the booster piston 52 have moved from the initial position to a specific position is the same as the fluid quantity V at the specific position. Therefore, if the fluid pressure Pb at that time is detected, a fluid quantity change ΔV corresponding to the fluid pressure Pb can be obtained.

Accordingly, if the fluid pressure sensor calculates a fluid pressure Pb, a fluid quantity change (volume change) ΔV can be obtained from the above-described Pb–ΔV corresponding relationship [Pb=f(ΔV)]. By substituting the fluid quantity change ΔV and the relative displacement ΔX, which is known, into Equation (8), the stroke Xi of the input piston 58 can be calculated. It should be noted that the characteristics gradually change with aging such as wear of disk brake pads. In this regard, the multiple-order curve showing the Pb–ΔV characteristics in FIG. 24 can be approximated to the actual characteristics by properly correcting it, for example, by the factors of mileage and the number of times of braking.

(B1) Regarding the fact that the input absolute displacement can be estimated (obtained) by using the brake pedal depressing force sensor as the input absolute displacement detecting means:

The stroke Xi of the input piston 58 and the stroke Xb of the booster piston 52 cause a relative displacement of Xi−Xb=ΔX (known). On this occasion, the fluid pressure Pb in the pressure chamber 2A is given by Equation (9).

$$Pb=Fi/Ai=(FiO-K\cdot \Delta X)/Ai \tag{9}$$

On the basis of Equation (9) and the above-described Pb–ΔV corresponding relationship [Pb=f(ΔV)], the fluid quantity change (volume change) ΔV can be obtained from the brake pedal depressing force FiO detected by the brake pedal depressing force sensor.

Therefore, by applying the fluid quantity change ΔV thus obtained to Equation (8) in the same way as the above (A1), the stroke Xi of the input piston 58 can be calculated. In other words, the stroke Xi of the input piston 58 can be calculated from the data (depressing force FiO) detected by the brake pedal depressing force sensor.

(C1) Regarding the fact that the input absolute displacement can be estimated (obtained) by using the current sensor as the input absolute displacement detecting means:

The stroke Xi of the input piston 58 and the stroke Xb of the booster piston 52 cause a relative displacement of Xi−Xb=ΔX (known). On this occasion, the fluid pressure Pb in the pressure chamber 2A is given by Equation (10).

$$Pb=Fb/Ab=(FbO+K\cdot \Delta X)/Ab \tag{10}$$

On the basis of Equation (10) and the above-described Pb–ΔV corresponding relationship [Pb=f(ΔV)], the fluid quantity change (volume change) ΔV can be obtained from the booster thrust Fb, i.e. the electric current supplied to the motor 64, which is the source of generating the booster thrust Fb. The electric current is detected with the current sensor.

Therefore, by applying the fluid quantity change ΔV thus obtained to Equation (8) in the same way as the above (A1), the stroke Xi of the input piston 58 can be calculated. In other words, the stroke Xi of the input piston 58 can be calculated from the data (current value) detected by the current sensor.

Next, an electrically actuated booster 50C according to a third embodiment of the present invention will be explained on the basis of FIGS. 25 and 26 and with reference to the first embodiment (FIGS. 1 to 17).

The electrically actuated booster 50C according to the third embodiment differs from the first embodiment mainly in the following points: (i) The controller 92 of the first embodiment uses data detected by the relative displacement sensor 100 for feedback control; and (ii) to set a target displacement C, the controller 92 uses characteristic data in part (b) of FIGS. 4 to 10 stored in the memory 101 in advance. In the third embodiment, a controller 92C is provided in place of the controller 92. (ic) The controller 92C uses data (assist absolute displacement detected value D) detected by the resolver 91 for feedback control; and (iic) to set a target displacement C, the controller 92C uses characteristic data in part (a) of FIGS. 4 to 10 stored in the memory 101 in advance.

Figure 25:
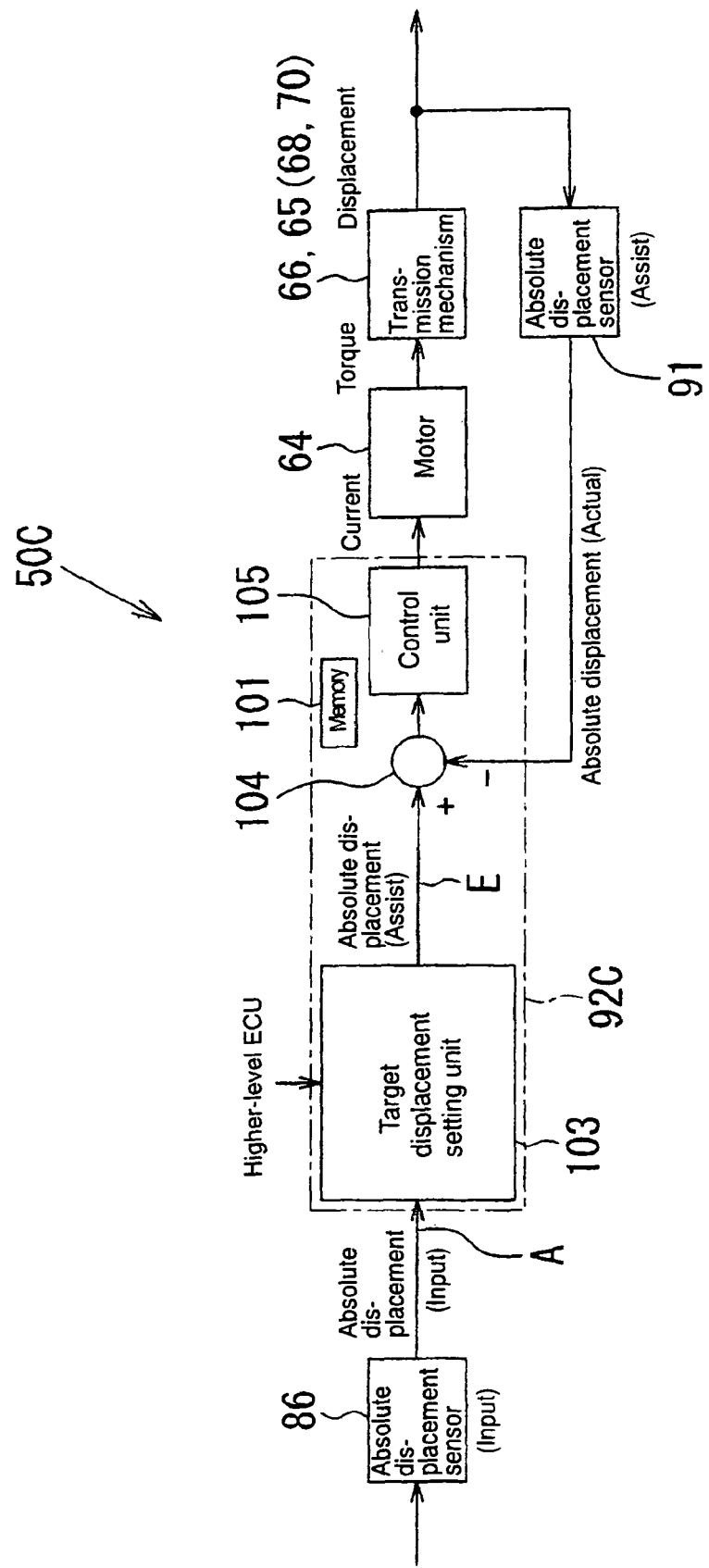
FIG. 25 is a block diagram showing a control system of an electrically actuated booster according to a third embodiment of the present invention.

In FIG. 25, the controller 92C sets the absolute displacement of the booster piston 52 as a target displacement (hereinafter referred to as "assist target displacement E") according to the detection signal from the potentiometer 86 so that the relative displacement relationship between the input piston 58 and the booster piston 52 becomes variable. To set the assist target displacement E, the controller uses characteristic data in part (a) of FIGS. 4 to 10 stored in the memory 101 in advance. The assist target displacement E is obtained as an assist stroke relative to the input stroke from the characteristic data in part (a) of FIGS. 4 to 10. That is, the assist target displacement E is obtained from the relative corresponding relationship between the input stroke and the assist stroke and hence per se includes the relative displacement relationship between the input piston 58 and the booster piston 52.

The electrically actuated booster 50C according to the third embodiment of the present invention is similar to the electrically actuated booster 50 according to the first embodiment in the following points: A target displacement (assist target displacement E) that makes variable the relative displacement relationship between the input piston 58 and the booster piston 52 is set according to the detection signal from the potentiometer 86 (claim 1); and the electric motor 64 is controlled so that the relative displacement relationship between the input piston 58 (input member) and the booster piston 52 (assist member) becomes equal to the target displacement (assist target displacement E) (claim 1). These points correspond to what is claimed in claim 1.

The control system of the electrically actuated booster 50C, including the controller 92C, is arranged as shown in FIG. 25 corresponding to FIG. 3. The controller 92C is adapted to execute a basic flow shown in FIG. 26.

Figure 26:
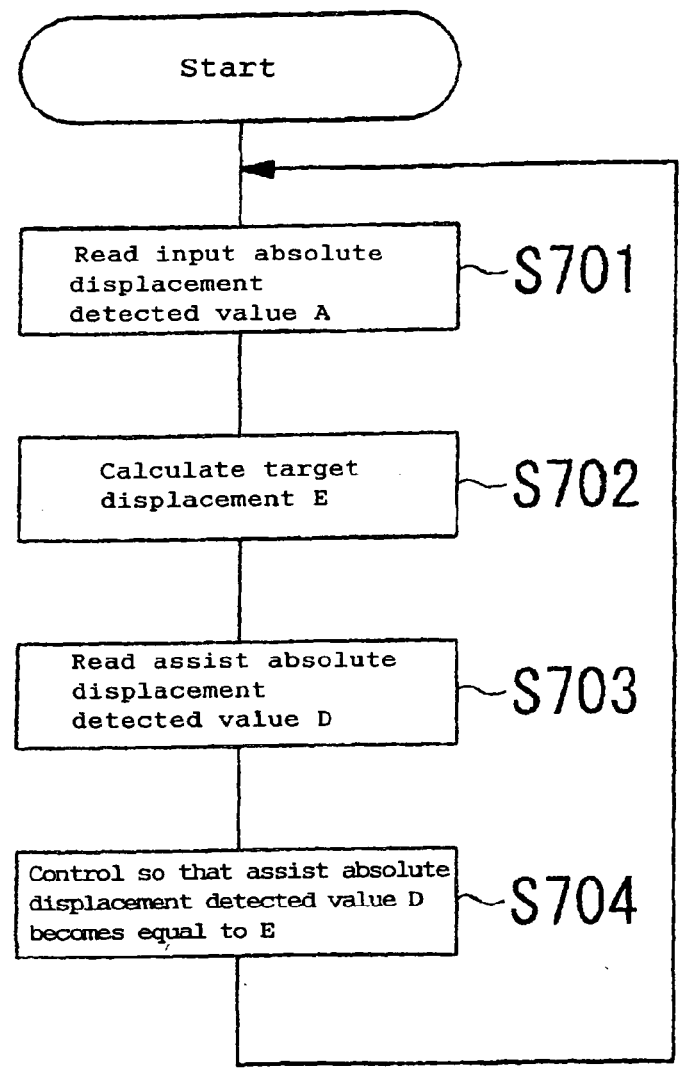
FIG. 26 is a flowchart showing a basic flow to explain the operation of the electrically actuated booster according to the third embodiment.

At step S701 in FIG. 26, an input absolute displacement detected value A detected by the potentiometer 86 is read. At step S702 subsequent to step S701, an assist target displacement E, which is an absolute displacement of the booster piston 52, is calculated by using the input stroke-assist stroke characteristics shown in part (a) of FIGS. 4 to 10 (the assist target displacement E per se includes the relative displacement relationship between the input piston 58 and the booster piston 52, as stated above).

At step S703 subsequent to step S702, an assist absolute displacement detected value D detected by the resolver 91 is read.

At step S704 subsequent to step S703, the controller controls the electric motor 64 (the electrically-operated actuator 53) so that the assist absolute displacement detected value D becomes equal to the assist target displacement E (D=E or E−D=0).

In the first and second embodiments, the relative displacement is subjected to feedback control, whereas, in the third embodiment, the absolute displacement of the booster piston 52 is feedback-controlled.

Figure 27:
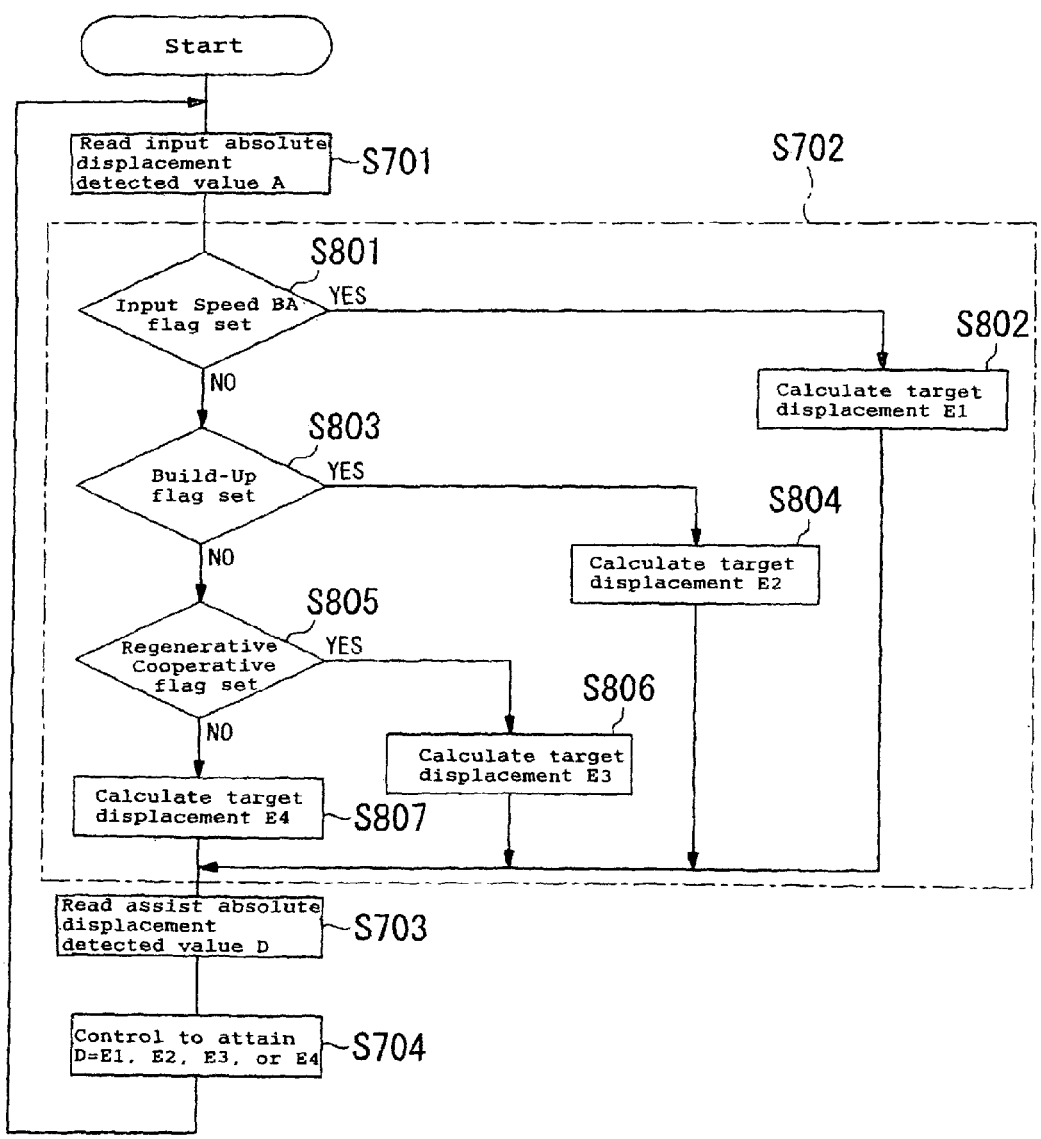
FIG. 27 is a flowchart of a modification of the basic flow shown in FIG. 26, in which the contents of step S702 of the basic flow have been changed to make the flow compatible with various control processes.

The flowchart of FIG. 27, which corresponds to FIG. 12, has steps S801 to 807 in place of step S702 shown in the basic flow of FIG. 26.

Steps S801 to S807 correspond to steps S101 to S107 shown in FIG. 12. Step S801 is, as shown in FIG. 27, executed subsequently to step S701 to judge whether or not there is an Input Speed BA flag that is generated by the Input Speed BA flag generation flow shown in FIG. 13, which is running in parallel to this flow. If "YES" is the answer at step S801, a target displacement E1 is calculated (step S802) by using the target displacement calculation characteristic data for [Brake Assist Control] shown in part (a) of FIG. 7, etc., and the process proceeds to step S703.

If "NO" is the answer at step S801, it is judged (step S803) whether or not there is a Build-Up flag that is generated by the Build-Up flag generation flow shown in FIG. 14, which is running in parallel to this flow.

If "YES" is the answer at step S803, a target displacement E2 is calculated (step S804) by using the target displacement calculation characteristic data for [Build-Up Control] shown in part (a) of FIG. 8, etc., and the process proceeds to step S703.

If "NO" is the answer at step S803, it is judged (step S805) whether or not there is a Regenerative Cooperative flag that is generated by the Regenerative Cooperative flag generation flow shown in FIG. 15, which is running in parallel to this flow. If "YES" is the answer at step S805, a target displacement E3 is calculated (step S806), and the process proceeds to step S703. It should be noted that the processing at step S806 for calculating a target displacement E3 for regenerative cooperative control can be carried out in the same way as the regenerative cooperative control target displacement setting flow shown in FIG. 16 by calculating the target displacement E3 by using data prescribing the relationship between the fluid pressure and the assist stroke absolute displacement as the above-described characteristic data L1, L2, etc. for calculating a target displacement for [Regenerative Cooperative Control] shown in part (d) of FIG. 9, instead of using data prescribed in terms of the relationship between the fluid pressure and the relative displacement (specifically, at steps S407 and 408, an assist stroke absolute displacement is calculated in place of a relative displacement and set as the target displacement E3).

If "NO" is the answer at step S805, a target displacement E4 is calculated (step S807) by using the target displacement calculation characteristic data for [Variable Boost Control] shown in part (a) of FIG. 5, etc., and the process proceeds to step S703.

The third embodiment also offers the same advantageous effects as those in the foregoing first embodiment.

In the electrically actuated booster 50C according to the third embodiment shown in FIGS. 25 and 26, the potentiometer 86 is used as the input absolute displacement detecting means to obtain an input absolute displacement, by way of example. In the third embodiment also, a fluid pressure sensor, a pedal depressing force sensor or a current sensor may be used in place of the potentiometer 86, as stated above. This will be explained with reference to FIGS. 23 and 24. In this case, the stroke Xb of the booster piston 52 is already known from the detection signal from the resolver 91.

(A2) Regarding the fact that the input absolute displacement can be estimated (obtained) by using the fluid pressure sensor as the input absolute displacement detecting means:

The stroke Xi of the input piston 58 and the stroke Xb of the booster piston 52 cause a fluid quantity change (volume change) $\Delta V$ given by Equation (11) to occur in the pressure chamber 2A.

$$\Delta V = Xb \cdot Ab + Xi \cdot Ai \quad (11)$$

Equation (11) may be changed to obtain Equation (12).

$$Xi = (\Delta V - Xb \cdot Ab)/Ai \quad (12)$$

On the basis of Equation (11) and the above-described Pb–$\Delta V$ corresponding relationship [Pb=f($\Delta V$)], a fluid quantity change (volume change) $\Delta V$ can be obtained from the fluid pressure Pb detected by the fluid pressure sensor.

Therefore, by substituting the fluid quantity change $\Delta V$ obtained as stated above and the stroke Xb, which is known, into Equation (12), the stroke Xi of the input piston 58 can be calculated. In other words, the stroke Xi of the input piston 58 can be calculated from the data (fluid pressure Pb) detected by the fluid pressure sensor.

(B2) Regarding the fact that the input absolute displacement can be estimated (obtained) by using the brake pedal depressing force sensor as the input absolute displacement detecting means:

The fluid quantity change (volume change) $\Delta V$ is given by the following Equation (13).

$$\Delta V = Xb \cdot Ab + (Xb + \Delta X) \cdot Ai \quad (13)$$

On the basis of Equations (13) and (9) and the above-described corresponding relationship Pb=f($\Delta V$), $\Delta X$ can be obtained from the known data and the brake pedal depressing force FiO detected by the brake pedal depressing force sensor.

Meanwhile, Xi is given by the following Equation (14). The stroke Xi of the input piston 58 can be calculated from the above-obtained $\Delta X$.

$$Xi = Xb + \Delta X \quad (14)$$

Thus, the stroke Xi of the input piston 58 can be calculated from the brake pedal depressing force FiO detected by the brake pedal depressing force sensor.

(C2) Regarding the fact that the input absolute displacement can be estimated (obtained) by using the current sensor as the input absolute displacement detecting means:

The fluid pressure Pb in the pressure chamber 2A is given by Equation (10), and the fluid quantity change (volume change) $\Delta V$ is given by Equation (13). On the basis of Equations (10) and (13) and the above-described corresponding relationship Pb=f($\Delta V$), $\Delta X$ can be obtained from the known data and the booster thrust Fb (i.e. the electric current detected by the current sensor, which is the source of generating the booster thrust Fb).

Meanwhile, Xi is given by the above Equation (14). The stroke Xi of the input piston 58 can be calculated from the above-obtained $\Delta X$.

Thus, the stroke Xi of the input piston 58 can be calculated from the electric current value detected by the current sensor.

The invention claimed is:
1. An electrically actuated booster comprising:
a master cylinder that generates a brake fluid pressure;
an input member that moves forward and backward in response to an operation of a brake pedal;
a booster piston configured to control the brake fluid pressure in the master cylinder by moving in the master cylinder;
an electrically-operated actuator that causes the booster piston to move;
a target displacement setting unit that sets a target value of a relative displacement between the booster piston and the input member based on an operation amount of the brake pedal, or that sets a target value of an absolute displacement of the booster piston based on the operation amount of the brake pedal;
a controller that controls the electrically-operated actuator so that the relative displacement between the booster piston and the input member becomes equal to the target value of the relative displacement set by the target displacement setting unit or the absolute displacement of the booster piston becomes the target value of the absolute displacement.

2. The electrically actuated booster of claim 1, wherein the target displacement setting unit sets the target value of the relative displacement or the target value of the absolute displacement to obtain various brake characteristics by changing the relative positional relationship between the input member and the booster piston.

3. The electrically actuated booster of claim 1, wherein the target displacement setting unit sets the target value of the relative displacement between the booster piston and the input member based on the operation amount of the brake pedal or sets the target value of the absolute displacement of the booster piston based on the operation amount of the brake pedal so that a forward movement of the booster piston becomes larger than a forward displacement of the input member in a direction for increasing the brake fluid pressure, and the relative displacement between the booster piston and the input member increases according to a forward movement of the booster piston.

4. The electrically actuated booster of claim 1, wherein the target displacement setting unit sets the target value of the relative displacement between the booster piston and the input member based on the operation amount of the brake pedal or sets the target value of the absolute displacement of the booster piston based on the operation amount of the brake pedal so that the booster piston moves backward relative to the forward movement of the input member in a direction for increasing the brake fluid pressure.

5. The electrically actuated booster of claim 1, further comprising a relative displacement detecting means that detects a relative displacement between the booster piston and the input member, wherein the controller that controls the electrically-operated actuator controls the electrically-operated actuator based on a signal from the relative displacement detecting means so that the relative displacement becomes the target value of the relative displacement set by the target displacement setting unit.

6. The electrically actuated booster of claim 1, further comprising a booster piston displacement detecting means that detects a displacement of the booster piston, wherein the controller that controls the electrically-operated actuator controls the electrically-operated actuator based on a signal from the booster piston displacement detecting means so that the absolute displacement becomes the target value of the absolute displacement set by the target displacement setting unit.

7. An electrically actuated booster comprising:
a master cylinder that generates a brake fluid pressure;
an input member that moves forward and backward in response to an operation of a brake pedal;
a booster piston configured to control the brake fluid pressure in the master cylinder by moving in the master cylinder;
an electrically-operated actuator that causes the booster piston to move;
a target displacement setting unit that sets a target value of a relative displacement between the booster piston and the input member based on an operation amount of the brake pedal;
a controller that controls the electrically-operated actuator so that the relative displacement between the booster piston and the input member becomes equal to the target value of the relative displacement set by the target displacement setting unit; and
a memory that stores characteristic data relating to the relative displacement between the booster piston and the input member to a displacement of the brake pedal that is an operation amount of the brake pedal;
wherein the target displacement setting unit sets the target value of the relative displacement based on the characteristic data stored in the memory.

8. The electrically actuated booster of claim 7, wherein the memory stores a plurality of types of characteristic data, as the characteristic data, for obtaining various brake characteristics by changing the relative displacement between the booster piston and the input member to the displacement of the brake pedal.

9. The electrically actuated booster of claim 7, wherein the target displacement setting unit sets the target value of the relative displacement between the booster piston and the input member based on the displacement of the brake pedal so that a forward movement of the booster piston becomes larger than a forward movement of the input member in a direction for increasing the brake fluid pressure, and the relative displacement between the booster piston and the input member increases according to a forward movement of the booster piston.

10. An electrically actuated booster comprising:
a master cylinder that generates a brake fluid pressure;
a booster piston configured to control the brake fluid pressure in the master cylinder by moving in the master cylinder;
an electrically-operated actuator that causes the booster piston to move;
a target displacement setting unit that sets a target value of an absolute displacement of the booster piston based on an operation amount of a brake pedal;
a controller that controls the electrically-operated actuator so that the absolute displacement of the booster piston becomes the target value of the absolute displacement set by the target displacement setting unit; and
a memory that stores a characteristic data relating to the absolute displacement of the booster piston to a displacement of the brake pedal that is the operation amount of the brake pedal;
wherein the target displacement setting unit sets the target value of the absolute displacement based on the characteristic data stored in the memory.

11. The electrically actuated booster of claim 10, wherein the memory stores a plurality of types of characteristic data, as the characteristic data, for obtaining various brake characteristics by changing the absolute displacement of the booster piston to the displacement of the brake pedal.

12. The electrically actuated booster of claim 10, wherein the target displacement setting unit sets the target value of the absolute displacement of the booster piston based on the displacement of the brake pedal so that a forward movement of the booster piston becomes larger than a forward movement of the brake pedal in a direction for increasing the brake fluid pressure, and the absolute displacement of the booster piston to the absolute displacement of the brake pedal increases according to a forward movement of the booster piston.

13. An electrically actuated booster comprising:
a housing;
a master cylinder that is supported by the housing and generates a brake fluid pressure;
a booster piston configured to move forward and backward along an axis of the master cylinder and to control the brake fluid pressure generated by the master cylinder;
an electrically-operated actuator having an electric motor to cause the booster piston to move forward and backward;
a controller that controls the electrically-operated actuator;
a displacement measuring means detecting a braking operation amount by an operation of the brake pedal;

an input member that moves forward and backward along an axis of the booster piston in response to a braking operation of a brake pedal; and urging means provided between the input member and the booster piston to urge the input member relative to the booster piston toward an initial position of the input member, wherein the master cylinder generates a brake fluid pressure based on a thrust force of the input member and a thrust force of the booster piston so that a part of a reaction force caused by the brake fluid pressure is transmitted to the input member, and another part of the reaction force is transmitted to the booster piston, respectively, wherein when the regenerative braking operation is performed by the regenerative braking system, the urging means compensate a reduction of the reaction force to the input member by the reduction of the brake fluid pressure in the master cylinder, based on the displacement of the booster piston, wherein the controller calculates a target position of the booster piston based on an output of displacement measuring means, and controls the electrically-operated actuator based on the target position, and wherein when a braking operation by a regenerative braking system is performed, the controller calculates a target position of the booster piston where the booster piston is displaced in a direction for reducing the brake fluid pressure, relative to a target position of the booster piston calculated when the braking operation by the regenerative braking system is not performed, and controls the electrically-operated actuator based on the calculated target position.

14. The electrically actuated booster of claim 13, wherein when a regenerative braking operation is performed, the controller controls the electrically-operated actuator by performing regenerative cooperative control so that the booster piston moves and the brake fluid pressure generated in the master cylinder is reduced by an amount corresponding to a regenerative braking force generated during regeneration.

15. The electrically actuated booster of claim 13, wherein the controller calculates a relative position of the booster piston to the input member as the target position, based on the output of the displacement measuring means, and controls the electrically-operated actuator based on the calculated target position.

16. The electrically actuated booster of claim 13, wherein the displacement detecting means generates an output representing an absolute displacement of the input member relative to the vehicle body, and wherein the controller calculates a target displacement of the booster piston based on the output of the displacement measuring means representing the absolute displacement of the input member.

* * * * *